(12) United States Patent
Hashimoto et al.

(10) Patent No.: US 9,257,141 B2
(45) Date of Patent: Feb. 9, 2016

(54) POLARIZATION CONVERSION ELEMENT

(75) Inventors: Nobuyuki Hashimoto, Iruma (JP); Makoto Kurihara, Kawagoe (JP); Kenji Matsumoto, Tokyo (JP); Masafumi Yokoyama, Tokyo (JP); Ayano Tanabe, Tokyo (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 509 days.

(21) Appl. No.: 13/581,198

(22) PCT Filed: Feb. 24, 2011

(86) PCT No.: PCT/JP2011/054820
§ 371 (c)(1),
(2), (4) Date: Aug. 24, 2012

(87) PCT Pub. No.: WO2011/105619
PCT Pub. Date: Sep. 1, 2011

(65) Prior Publication Data
US 2012/0314180 A1 Dec. 13, 2012

(30) Foreign Application Priority Data
Feb. 26, 2010 (JP) .................................. 2010-042867

(51) Int. Cl.
*G02F 1/1347* (2006.01)
*G02F 1/1343* (2006.01)
(Continued)

(52) U.S. Cl.
CPC .......... *G11B 7/13925* (2013.01); *G02B 27/286* (2013.01); *G02F 1/0136* (2013.01);
(Continued)

(58) Field of Classification Search
CPC .................................................... G02F 1/0136
USPC ................................................. 349/194, 75
See application file for complete search history.

(56) References Cited

U.S. PATENT DOCUMENTS

| 7,518,674 | B2 * | 4/2009 | Moriya .......................... 349/75 |
|---|---|---|---|
| 2009/0244411 | A1 * | 10/2009 | Takane et al. ..................... 349/1 |
| 2010/0141939 | A1 | 6/2010 | Zhan |

FOREIGN PATENT DOCUMENTS

| JP | 2001-159751 A | 6/2001 |
|---|---|---|
| JP | 2006-313273 A | 11/2006 |

(Continued)

OTHER PUBLICATIONS

Sun et al, "Ultrasmall focusing spot with a long depth of focus based on polarization and phase modulation", Optics Letters, Jan. 15, 2003 p. 99-101, vol. 28 No. 2, Opt Soc of Amer.
(Continued)

*Primary Examiner* — Wen-Ying P Chen

(57) ABSTRACT

A polarization conversion element includes a phase reversal element and a polarization plane rotation element including a liquid crystal layer. The liquid crystal layer has a plurality of regions disposed along circumferential direction with the intersection point of the polarization plane rotation element and the optical axis as the center with alignment directions different from each other. When electric voltage in accordance with the wavelength of linear polarization incident on the polarization plane rotation element is applied, each region rotates the polarization plane of the polarization component transmitted by each region, and thereby converts linear polarization to radial polarization. The phase reversal element reverses, among the first and the second annular portions alternately disposed along the radial direction with the optical axis as the center, the phase of light incident on the first annular portion relative to the phase of light incident on the second annular portion.

10 Claims, 11 Drawing Sheets

(51) Int. Cl.

| | | |
|---|---|---|
| *G02F 1/13* | (2006.01) | |
| *G11B 7/1392* | (2012.01) | |
| *G02B 27/28* | (2006.01) | |
| *G11B 7/1369* | (2012.01) | |
| *G02F 1/01* | (2006.01) | |

(52) U.S. Cl.
CPC ........ *G02F1/1347* (2013.01); *G02F 1/134309* (2013.01); *G11B 7/1369* (2013.01); *G02F 2203/04* (2013.01); *G02F 2203/07* (2013.01); *G02F 2203/50* (2013.01)

(56) References Cited

FOREIGN PATENT DOCUMENTS

| | | | |
|---|---|---|---|
| JP | 2007-115299 | A | 5/2007 |
| JP | 2007-193025 | A | 8/2007 |
| JP | 2008-039882 | A | 2/2008 |
| JP | 2009-116311 | A | 5/2009 |
| JP | 2009-541742 | A | 11/2009 |
| JP | 2010-019630 | A | 1/2010 |
| WO | 2008/071823 | A2 | 6/2008 |

OTHER PUBLICATIONS

Wang et al., "Creation of a needle of longitudinally polarized light in vacuum using binary optics", Nature Photonics, Jun. 28, 2008, p. 501-505, vol. 2, Macmillan Publishers, online.
Yoshiki et al., "High Resolution Imaging of Cell Organelle Using Compact Polarization Mode Converter", JBMES, Dec. 2008, p. 698-702, Osaka, Japan, Section 3: Partial Translation.
International Search Report for PCT/JP2011/054820, May 10, 2011.
Nishiyama et al. "One shot birefringence measurement using a liquid crystal radial polrizer" JSAP and Related Societies, Mar. 22, 2006, vol. 53 No. 3, p. 1067.
Hashimoto et al., "Beam Danmennai Henko Bunpu Seigyo to Kenbi Kansoku eno Oyo", Optical Alliance, Apr. 1, 2009, vol. 20, No. 4, pp. 21-25 ISSN0917-26X.
The State Intellectual Property Office of the People's Republic of China (SIPO), Office Action for Chinese Patent Application No. 201180010619.5, Aug. 29, 2014.
Extended European search report for EP Application No. 11747571.5, Apr. 1, 2015.
Ren Hongwen et al., "Linear to axial or radial polarization conversion using a liquid crystal gel", Applied Physics Letters, Aug. 3, 2006, vol. 89, No. 5, American Institute of Physics, US.

\* cited by examiner

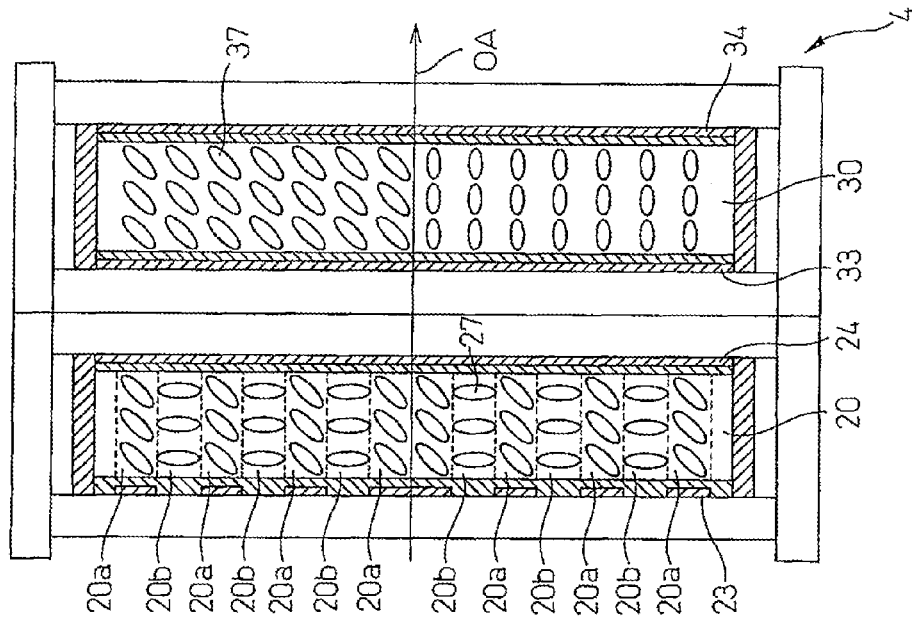
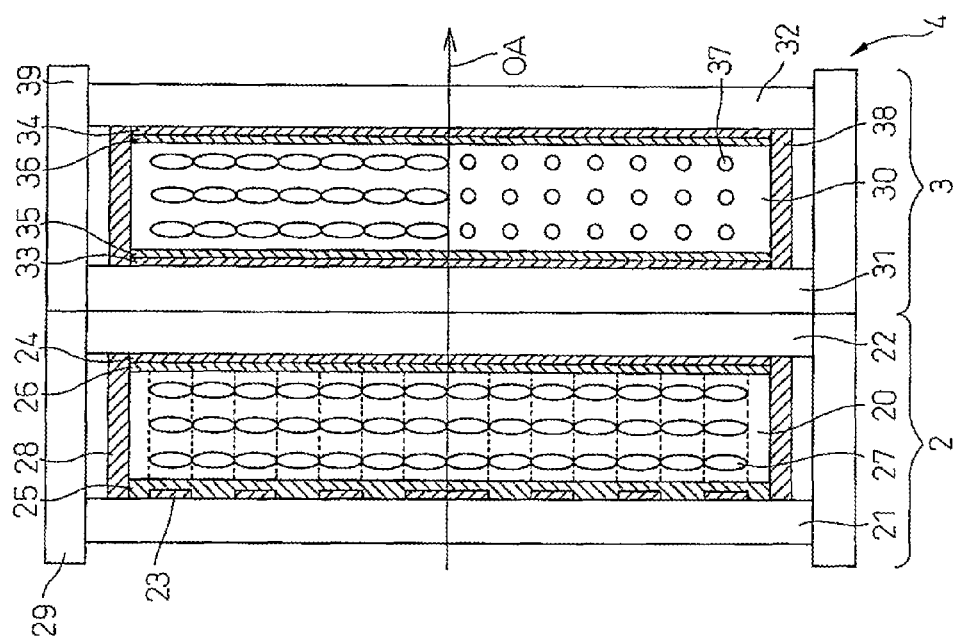

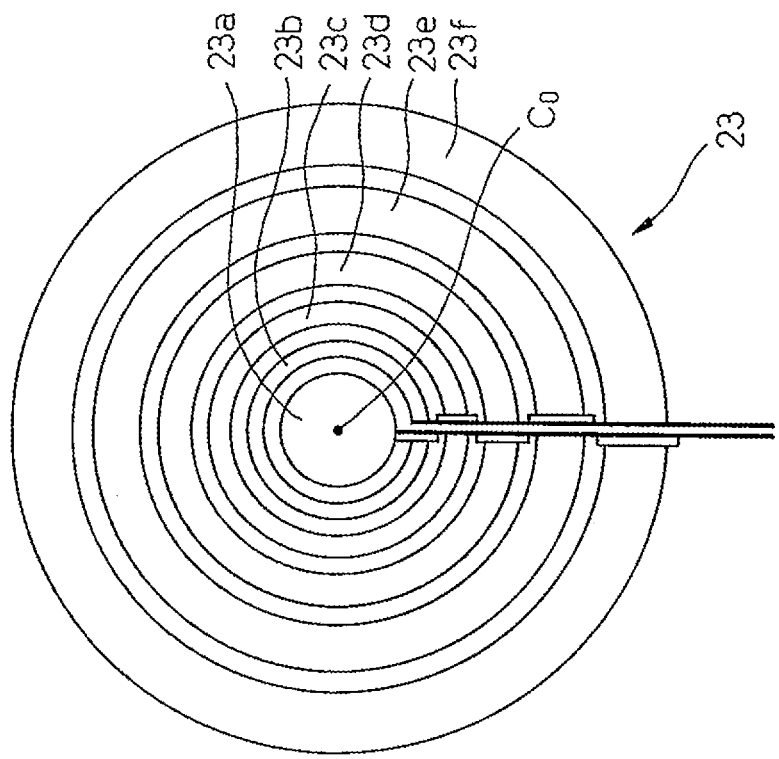
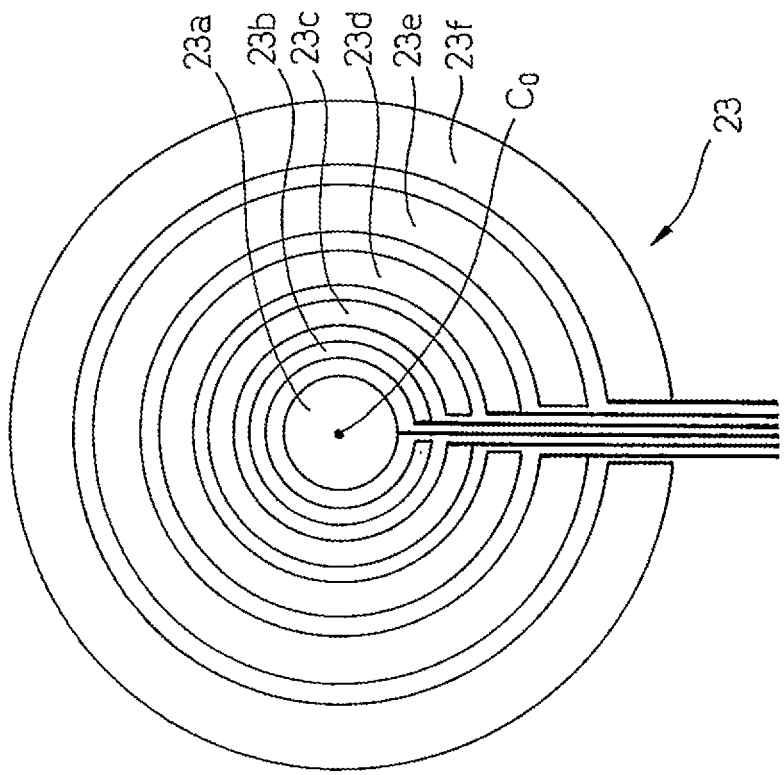

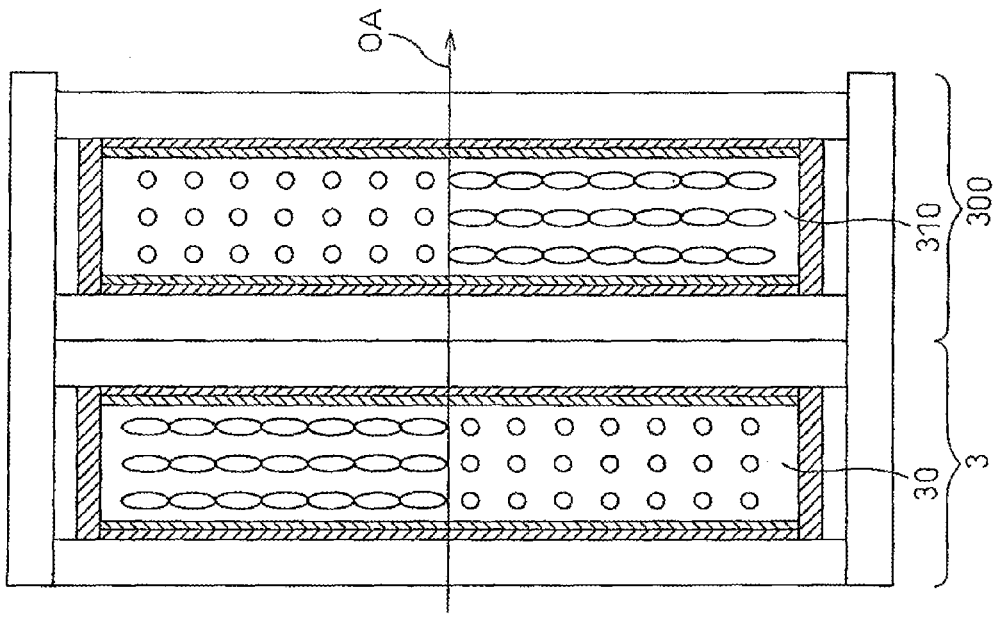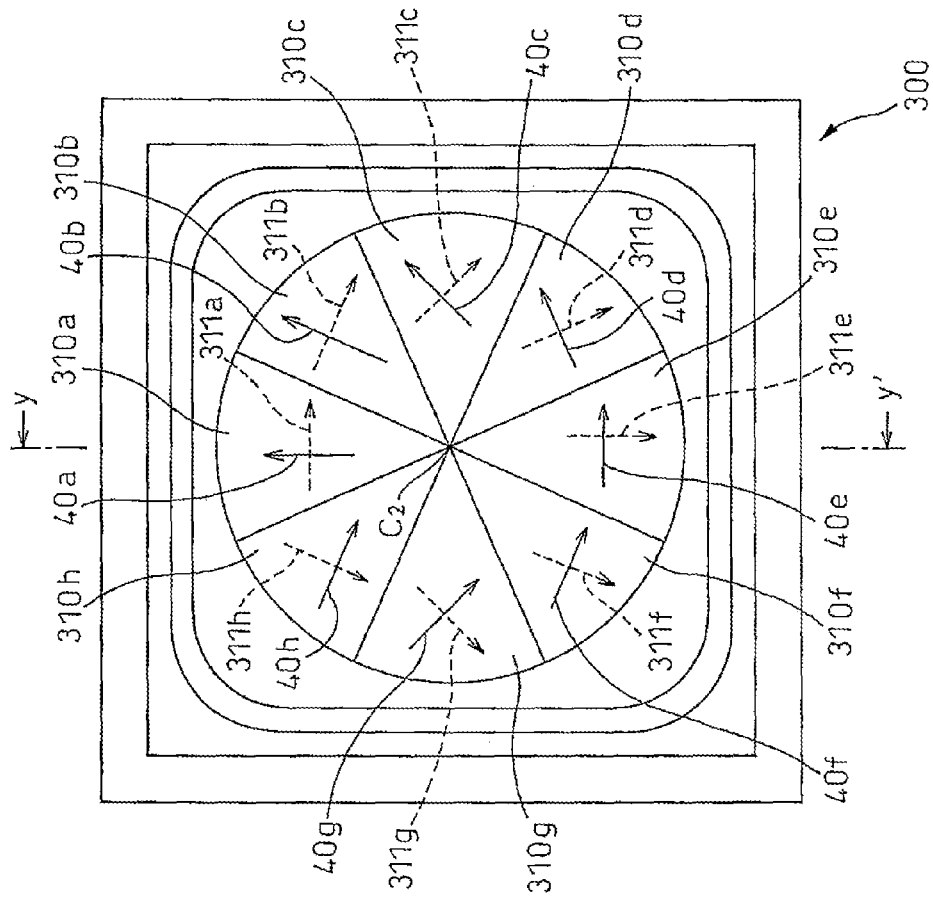

POLARIZATION CONVERSION ELEMENT

FIELD OF THE INVENTION

The present invention relates to a polarization conversion element that converts linear polarization to radial polarization.

BACKGROUND ART

Conventionally, an apparatus such as a laser microscope, an optical pickup apparatus, a laser processing machine, has been known which irradiates light beam to an object to thereby detect information on the shape, etc., of the object, or to produce some change in the object. In such an apparatus, it is desirable, in order to achieve high resolution, to obtain a beam spot radiated from a light source and focused on the object with size that is as small as possible. In general, the minimum diameter of the beam spot is defined by diffraction limit, and this minimum diameter is proportional to wavelength of light. Therefore, the shorter the wavelength of light radiated from the light source, the smaller is the diameter of beam spot.

However, a light source that emits light of short wavelength, i.e., a laser emitting violet light or ultra violet light is generally more expensive than a light source that emits light of longer wavelength, for example green light or red light. Also, in general, in the wavelength range from violet to ultra violet, light transmittance of optical material decreases as wavelength becomes shorter. Therefore, an optical material that exhibits high light transmittance for violet or ultra violet light is very limited.

Thus, radial polarization is now attracting much attention. Radial polarization is a polarized light beam in which polarization plane of linearly polarized light is distributed radially with the optical axis as a center. It is reported that, by focusing a light beam of radial polarization with a condenser to a focus, the focused light beam in the focus plane has Z-polarization (i.e., the direction of electric field is same as the direction of propagation of light), so that a light beam can be focused in smaller spot diameter than the spot diameter defined by diffraction limit of X- or Y-polarization). It is also reported that as the range of small beam diameter along the optical axis becomes longer, the larger a depth of focus can be achieved. (See, for example, Chin-Cherng Sun, Chin-Ku Liu, "Ultrasmall focusing spot with a long depth of focus based on polarization and phase modulation", OPTICS LETTERS, Optical Society of America, 2003, vol. 28, No. 2, p. 99-101; and HAIFENG WANG, et. al., "Creation of a needle of longitudinally polarized light in vacuum using binary optics", Nature photonics, 2008, vol. 2, p. 501-505).

SUMMARY OF THE INVENTION

In order to generate such radial polarization, a polarization conversion element is used in which a plurality of half wave plates are arranged in a plane perpendicular to the optical axis so as to have different directions of optic axis. Also, a polarization conversion element is proposed in which photonic crystal is used to convert linear polarization to radial polarization.

However, in a half wave plate or a photonic crystal, as wavelength of incident light varies, phase difference between ordinary ray and extraordinary ray varies. Therefore, in a polarization conversion element using half wave plates or photonic crystal, when wavelength of light incident on the polarization conversion element differs from the design wavelength of the element, it is no longer possible to convert the incident light to radial polarization.

Therefore, it is an object of the present invention to provide a polarization conversion element that is capable of converting linear polarization having wavelength included in a prescribed wavelength range to radial polarization.

In accordance with an aspect of the present invention, a polarization conversion element is provided. The polarization conversion element includes a phase reversal element that reverses the phase of a part of incident light having prescribed wavelength and a polarization plane rotation element that converts linear polarization having prescribed wavelength to radial polarization, arranged along the optical axis. In this polarization conversion element, the polarization plane rotation element includes a liquid crystal layer containing liquid crystal molecules and two first transparent electrodes disposed in opposition to each other so as to sandwich the liquid crystal layer between. The liquid crystal layer has a plurality of regions disposed along circumferential direction with a first intersection point of the polarization plane rotation element and the optical axis as the center, and an alignment direction of the liquid crystal molecules included in each of the plurality of regions is different from each other. Each of the plurality of regions of the liquid crystal layer rotates, when an electric voltage in accordance with prescribed wavelength is applied between the two first transparent electrodes, the polarization plane of the component of the linear polarization transmitting the region so as to become parallel to the radial direction with the first intersection point as the center in accordance with the alignment direction of liquid crystal molecules included in the region. The polarization plane rotation element thereby converts linear polarization to radial polarization.

The phase reversal element includes first annular portions and second annular portions alternately disposed along radial direction with the second intersection point of the phase reversal element and the optical axis as a center, the phase of the linear polarization or radial polarization incident on the first annular portion being reversed relative to the phase of the linear polarization or radial polarization incident on the second annular portion.

Preferably, the alignment direction of liquid crystal molecules included in each of the plurality of regions is such that the angle between the alignment direction and the polarization plane of linear polarization incident on the polarization plane rotation element is ½ of the angle of a prescribed line passing through the first intersection point and the region relative to the polarization plane, and when prescribed electric voltage is applied between the two transparent electrodes, the polarization plane rotation element rotate the polarization plane of the component of the linear polarization transmitted by each of the plurality of regions by twice the angle between the polarization plane and the alignment direction so as to make the polarization plane of the component parallel to the prescribed line described above.

The prescribed line in each of the plurality of regions is preferably a line passing through the first intersection point and bisecting the region.

Further, it is preferable to set the alignment direction in the plurality of regions such that, when among the plurality of regions, one of two regions intersecting a plane which is parallel to the polarization plane of the linear polarization incident on the polarization plane rotation element and passes the optical axis, is referred to as a first region and total number of regions is N, the angle θ between the alignment direction in the n-th region in the order of clockwise or anti-clockwise rotation starting from the first region and the polarization plane of linear polarization incident on the first region is $$\theta=360°\times(n-1)/(2N)$$

where n is an integer from 1 to N.

Preferably, the phase reversal element also has a second liquid crystal layer containing second liquid crystal molecules, and two second transparent electrodes disposed in opposition to each other so as to sandwich the second crystal layer, wherein one of the two second transparent electrodes is a plurality of annular electrodes corresponding to the first annular portions, and by applying electric voltage in accordance with the prescribed wavelength between the annular electrodes and the other of the two second transparent electrode, the phase of the linear polarization or radial polarization incident on the first annular portion is reversed.

Preferably, in this case, the phase reversal element is disposed on the incident side of the polarization plane rotation element, and the second liquid crystal molecules contained in the second liquid crystal layer are aligned along the direction parallel to the polarization plane of the linear polarization incident on the phase reversal element.

Alternatively, the phase reversal element is disposed on the exit side of the polarization plane rotation element, and preferably, the second liquid crystal molecules contained in the second liquid crystal layer are aligned along the radial direction with the second intersection point as the center.

Preferably, the polarization conversion element further also includes a driving circuit which applies electric voltage varied in accordance with the prescribed wavelength between the two first transparent electrodes and between the two second transparent electrodes.

Preferably, the polarization conversion element further also includes a residual birefringence compensation element disposed on the incident side or the exit side of the polarization plane rotation element.

In this case, the residual birefringence compensation element has a plurality of second regions with the position projected in the direction of optical axis respectively coinciding with the plurality of regions of liquid crystal layer of the polarization plane rotation element, each of the plurality of second regions preferably has birefringence which cancels, when a second electric voltage is applied to the liquid crystal layer, the birefringence produced by a region among the plurality of regions of the liquid crystal layer which coincides in position projected in the direction along the optical axis.

Preferably, the residual birefringence compensation element also includes a third liquid crystal layer having a plurality of second regions, and each of the plurality of second regions in the third liquid crystal layer includes third liquid crystal molecules aligned in the direction orthogonal to the alignment direction of liquid crystal molecules in the region among the plurality of regions in the liquid crystal layer of the polarization plane rotation element which coincides in position projected in the direction along the optical axis.

With the polarization conversion element according to the present invention, it is possible to obtain an advantageous effect that, by adjusting the electric voltage applied to the liquid crystal layers, linear polarization can be converted to radial polarization at arbitrary wavelength within the prescribed range of wavelength. Also, this polarization conversion element permits incident light to be switched easily to either linear polarization or radial polarization simply by switching on or off the electric voltage applied to liquid crystal layers. Therefore, the polarization conversion element permits same location of an irradiated object to be irradiated by linear polarization, or by radial polarization, so that information on the effect of both polarization incident on the object can be easily obtained.

BRIEF DESCRIPTION OF THE DRAWINGS

FIG. 3A is a schematic side sectional view of the liquid crystal element taken along the line indicated by the arrow XX' of FIG. 2, when no electric voltage is applied, and FIG. 3B is a schematic side sectional view of the liquid crystal element taken along the line indicated by the arrow XX' of FIG. 2, when an electric voltage is applied;

FIGS. 9A and 9B are schematic front views respectively illustrating transparent electrodes provided on the incident side of the phase reversal element of the variant;

FIG. 12A is a schematic view of the residual birefringence compensation element of the polarization conversion element according to a variant of the present invention as seen from the incident side, and FIG. 12B is a schematic side sectional view of the polarization conversion element taken along the line indicated by the arrow yy' of FIG. 12A.

DESCRIPTION OF EMBODIMENTS

A polarization conversion element according to one embodiment of the present invention will be described with reference to appended drawings. The polarization conversion element includes a phase reversal element having a liquid crystal layer for reversing the phase of annular portion of incident linear polarization, and a polarization plane rotation element disposed on the exit side of the phase reversal element for converting the linear polarization to radial polarization. With such construction, the polarization conversion element not only converts linear polarization to radial polarization, but also it reverses the phase of a part of each linear polarization distributed radially included in the radial polarization. Also, by adjusting electric voltage applied to each liquid crystal layer, it can convert linear polarization of any wavelength within the prescribed range of wavelength to radial polarization.

Figure 1:
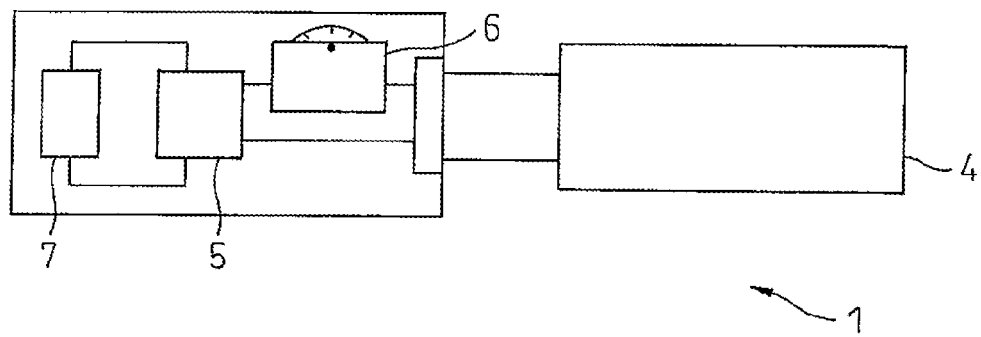
FIG. 1 illustrates the schematic construction of a polarization conversion element according to an embodiment of the present invention.

FIG. 1 is a schematic view illustrating the construction of a polarization conversion element according to an embodiment of the present invention. The polarization conversion element 1 includes a liquid crystal element 4 for converting incident linear polarization to radial polarization, a driving circuit 5 for driving the liquid crystal element 4, a voltage regulator 6 for adjusting electric voltage applied by the driving circuit 5 to the liquid crystal 4, and a power source 7 for supplying electric power to the polarization conversion element 1.

The liquid crystal element 4, the driving circuit 5 and the voltage regulator 6 are connected via a substrate having conductor, for example, a flexible printed circuit board (hereinafter referred to as FPC). The driving circuit 5 and the voltage regulator 6 may be mounted on FPC.

Figure 2:
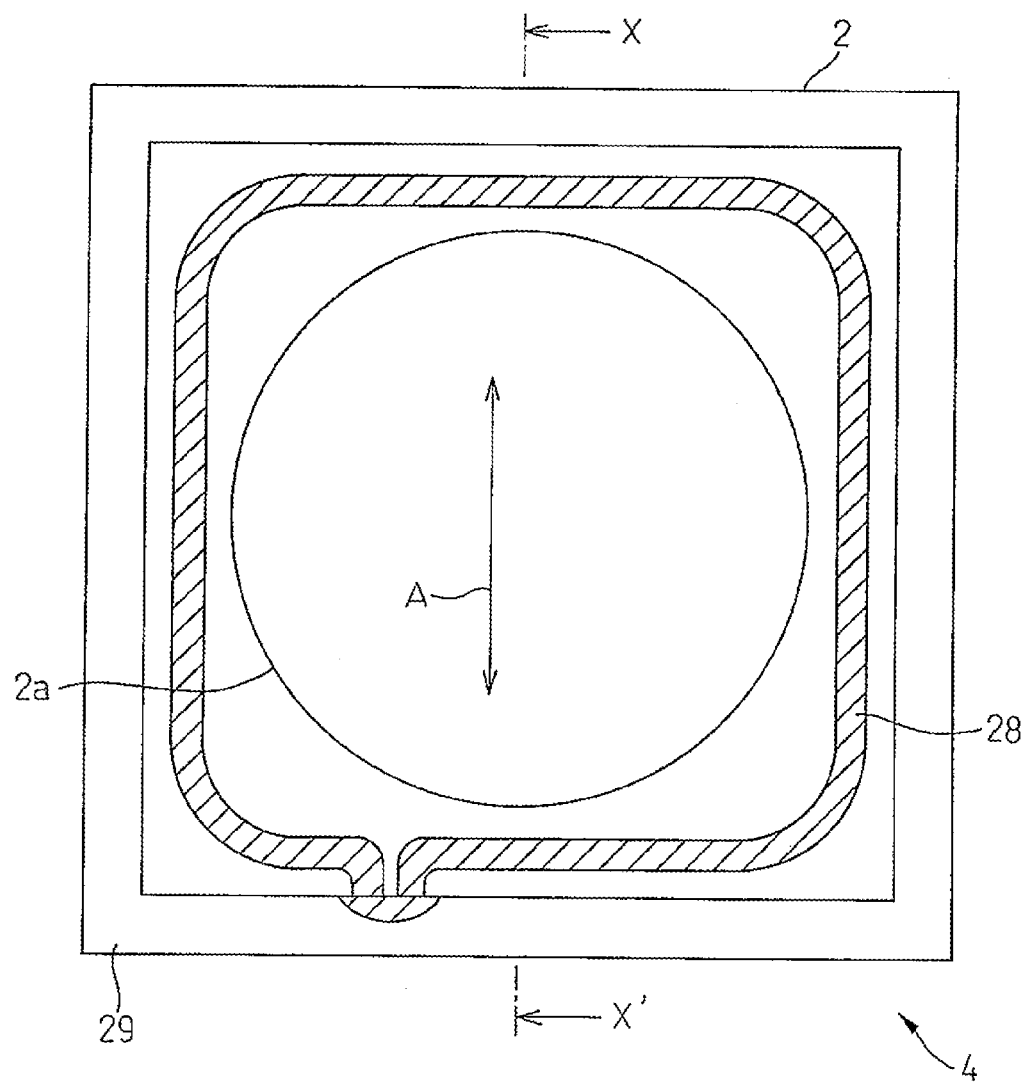
FIG. 2 is a schematic front view illustrating a liquid crystal element of the polarization conversion element.

FIG. 2 is a schematic front view illustrating the liquid crystal element 4 of the polarization conversion element 1. FIGS. 3A and 3B are respectively schematic side sectional view of the liquid crystal element 4 taken along the line indicated by the arrows X, X' of FIG. 2. FIG. 3A illustrates the state of liquid crystal molecules contained in the liquid crystal element 4 when no electric voltage is applied to the liquid crystal element 4, and FIG. 3B illustrates the state of liquid crystal molecules contained in the liquid crystal element 4 when an electric voltage is applied to the liquid crystal element 4.

As illustrated in FIGS. 2 and 3A, the liquid crystal element 4 includes a phase reversal element 2 and a polarization plane rotation element 3 disposed adjacent to the phase reversal element 2.

The light incident on the polarization conversion element 1 is linear polarization and incident from the side of the phase reversal element 2. The linear polarization is converted, by transmitting through the phase reversal element 2 and the polarization plane rotation element 3, to radial polarization and exits from the polarization plane rotation element 3.

For convenience of explanation, the polarization plane of light incident on the liquid crystal element 4 is assumed, as illustrated by the arrow A of FIG. 2, to be orthogonal to the plane of FIG. 2 and in the longitudinal plane.

The phase reversal element 2 reverses the phase of at least one annular portion with the optical axis OA as the center included in the region 2a illustrated in FIG. 2 relative to the phase of remaining portion. To this end, the phase reversal element 2 has a liquid crystal layer 20 and transparent substrates 21, 22 disposed substantially in parallel on both sides of the liquid crystal layer 20 along the optical axis OA. Liquid crystal molecules 27 contained in the liquid crystal layer 20 are sealed in between the transparent substrates 21, 22 and seal member 28. The phase reversal element 2 has a transparent electrode 23 disposed between the transparent substrate 21 and the liquid crystal layer 20, and a transparent electrode 24 disposed between the liquid crystal layer 20 and the transparent substrate 22. The transparent substrates 21, 22 are formed, for example, from material, for example, glass or resin, that is transparent to light having wavelength included in a prescribed wavelength range. The transparent electrodes 23, 24 are formed, for example, from material, called ITO, made of indium oxide added with tin oxide. An alignment film 25 is disposed between the transparent electrode 23 and the liquid crystal layer 20. Also, an alignment film 26 is disposed between the transparent electrode 24 and the liquid crystal layer 20. These alignment films 25, 26 align the liquid crystal molecules 27 in a prescribed direction. When the liquid crystal molecules 27 are aligned by method not using an alignment film, for example, by photo alignment, the alignment films 25, 26 may be omitted.

On the outer periphery of substrates, transparent electrodes and alignment films, a frame 29 is disposed, and the frame 29 holds various substrates.

As illustrated in FIG. 3A, the liquid crystal molecules 27 sealed in the liquid crystal layer 20 exhibits, for example, homogeneous alignment, and are aligned in a direction substantially in parallel to the polarization plane of incident linear polarization. In other words, the liquid crystal molecules are aligned such that the direction of long axis of liquid crystal molecules 27 is substantially parallel to the arrow A illustrated in FIG. 2.

Figure 4:
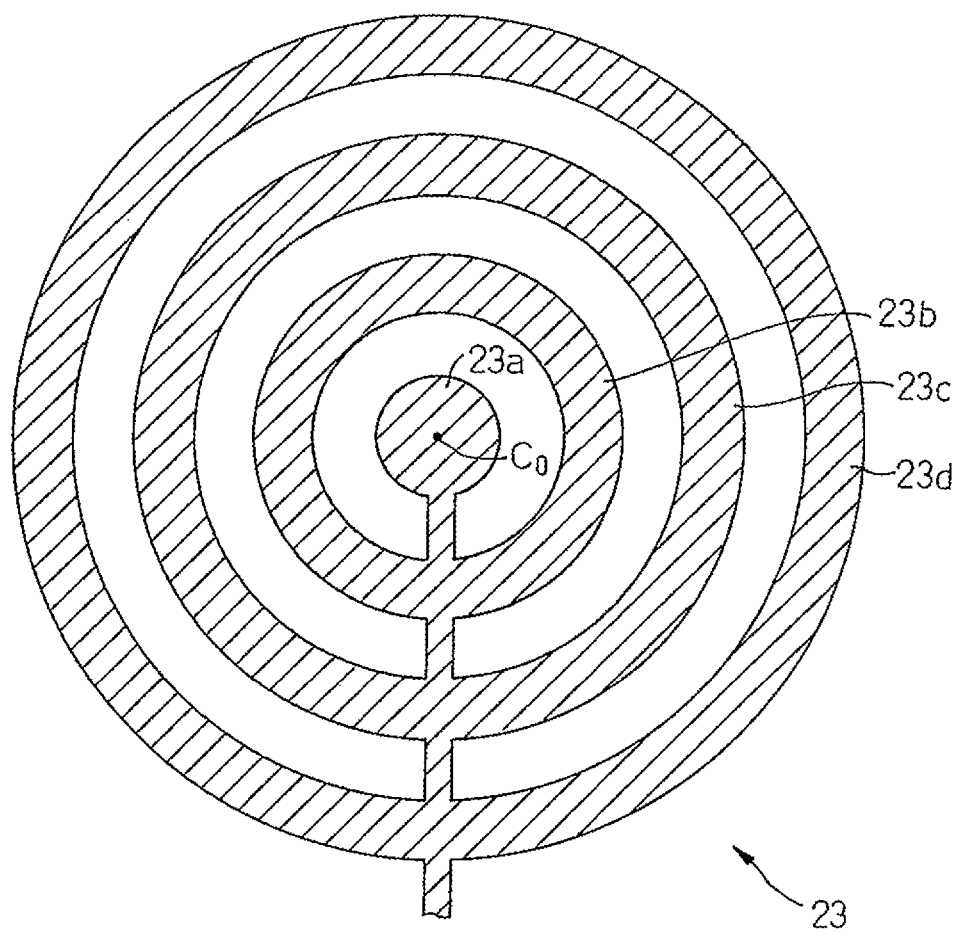
FIG. 4 is a schematic front view illustrating a transparent electrode of a phase reversal element.

FIG. 4 is a schematic front view illustrating the transparent electrode 23 provided in the phase reversal element 2 disposed on the incident side. On the other hand, the transparent electrode 24 is formed so as to cover the entire liquid crystal layer 20. The transparent electrode 24 may also have same form as the transparent electrode 23, or the transparent electrode 24 may have the electrode shape illustrated in FIG. 4 and the transparent electrode 23 may be formed so as to cover the entire liquid crystal layer 20.

The transparent electrode 23 has at least one annular shaped electrode in the shape of concentric circle with the intersection point $C_O$ of the optical axis OA and the phase reversal element 2 as the center. In the present embodiment, the transparent electrode 23 has 4 annular shaped electrodes 23a to 23d. With this construction, in the liquid crystal layer 20, there are alternately formed first annular shaped portions sandwiched between the annular shaped electrodes 23a to 23d and the transparent electrodes 24, and second annular shaped portions having only the transparent electrode 24 on one side in concentric circles. The outer circumference of the annular shaped electrode 23d corresponds to the outer circumference of the region 2a illustrated in FIG. 2. Although no electrode is provided between the annular shaped electrodes 23a to 23d, annular shaped electrodes for applying reference electric potential may be separately provided between the annular shaped electrodes 23a to 23d.

As illustrated in FIG. 3B, when electric voltage is applied by the driving circuit 5 between these annular shaped electrodes 23a to 23d and the transparent electrode 24 disposed in opposition with the liquid crystal layer interposed therebetween, the liquid crystal molecules are tilted such that the direction of the long axis of liquid crystal molecules contained in the first annular shaped portion 20a approaches from the direction orthogonal to the optical axis OA to the direction parallel to the optical axis OA. On the other hand, the liquid crystal molecules contained in the second annular shaped portion 20b not sandwiched between transparent electrodes remains in the direction orthogonal to the optical axis OA.

In general, the refractive index $n_e$ for the polarization component parallel to the long axis of liquid crystal molecule (i.e., for extraordinary ray) is higher than the refractive index $n_o$ for polarization component parallel to the short axis of liquid crystal molecule (i.e., for ordinary ray). When electric voltage is applied between the transparent electrodes 23 and 24, let the angle formed by the direction of long axis of liquid crystal molecule contained in the first annular shaped portion 20a with the direction of the applied electric voltage, i.e., the direction of the optical axis OA, be ψ, then, the light transmitting the liquid crystal layer 20 makes an angle ψ with the long axis direction of liquid crystal molecule. Let the refractive index of the liquid crystal molecules for the polarization component parallel to the alignment direction of the liquid crystal molecules be $n_\psi$, then $n_e \leq n_\psi \leq n_o$. Thus, if liquid crystal molecules 27 contained in the liquid crystal layer 20 are in homogeneous alignment, and thickness of the liquid crystal layer 20 is d, there arises an optical path difference Δnd ($=n_\psi d - n_o d$) between the polarization component passing the first annular portion 20a of the liquid crystal layer 20 sandwiched between the annular shaped electrodes 23a to 23d and the transparent electrode 24, and the polarization component passing the second annular portion 20b. Phase difference Δ between the two polarization components is 2πΔnd/λ, where λ is the wavelength of light incident on the liquid crystal layer 20.

In this way, by adjusting the electric voltage applied between the transparent electrode 23 and the transparent electrode 24, the phase reversal element 2 can modulate the phase of light passing the liquid crystal layer 20. Therefore, if a prescribed electric voltage in accordance with the wavelength of incident light is applied between the transparent electrode 23 and the transparent electrode 24, the phase reversal element 2 can shift the phase of light transmitted through the first annular portion 20a by π relative to the phase of light transmitted through the second annular portion 20b.

The polarization plane rotation element 3 converts the linear polarization incident thereto after passing the phase reversal element 2 into radial polarization which has radial distribution of linear polarization with the intersection point $C_1$ of the optical axis OA and the polarization plane rotation element 3 as the center. To this end, the polarization plane rotation element 3 has a liquid crystal layer 30 and transparent substrates 31, 32 disposed substantially in parallel on both sides of the liquid crystal layer 30 along the optical axis OA. Any One of the transparent substrate 31 and the transparent substrate 22 of the phase reversal element 2 may be omitted. In this case, for example, the liquid crystal layer 20 is formed on one surface of the transparent substrate 22 and the liquid crystal layer 30 is formed on the other surface of the transparent substrate 22.

The polarization plane rotation element 3 has also a transparent electrode 33 disposed between the transparent substrate 31 and the liquid crystal layer 30, and a transparent electrode 34 disposed between the liquid crystal layer 30 and the transparent substrate 32. Liquid crystal molecules 37 are sealed between the transparent substrates 31, 32 and a seal member 38. The transparent substrates 31, 32 are formed of material, for example, glass or resin, that is transparent to light having wavelength included in a prescribed wavelength range. The transparent electrodes 33, 34 are formed of material such as ITO. Further, an alignment film 35 is disposed between the transparent electrode 33 and the liquid crystal layer 30. Also an alignment film 36 is disposed between the transparent electrode 34 and the liquid crystal layer 30. These alignment films 35, 36 aligns liquid crystal molecules 37 in a prescribed direction. If liquid crystal molecules 37 are aligned by some method not using an alignment film, for example, by photo alignment method, the alignment films 35, 36 may be omitted.

Further, a frame 39 is disposed on the outer periphery of each substrate, each transparent electrode and each alignment film, and this frame 39 holds each substrate. The frame 29 and the frame 39 may be integrally formed as one unit.

The liquid crystal molecules sealed in the liquid crystal layer are aligned, for example, in homogeneous alignment. The liquid crystal layer 30 includes a plurality of circular sector regions arranged in a plane perpendicular to the optical axis OA with the intersection point $C_1$ as the center along the circumferential direction. Liquid crystal molecules 37 contained in each circular sector region are aligned such that the polarization plane of the incident linear polarization is rotated so as to become substantially parallel to the radial direction with the optical axis OA as the center.

Figure 5:
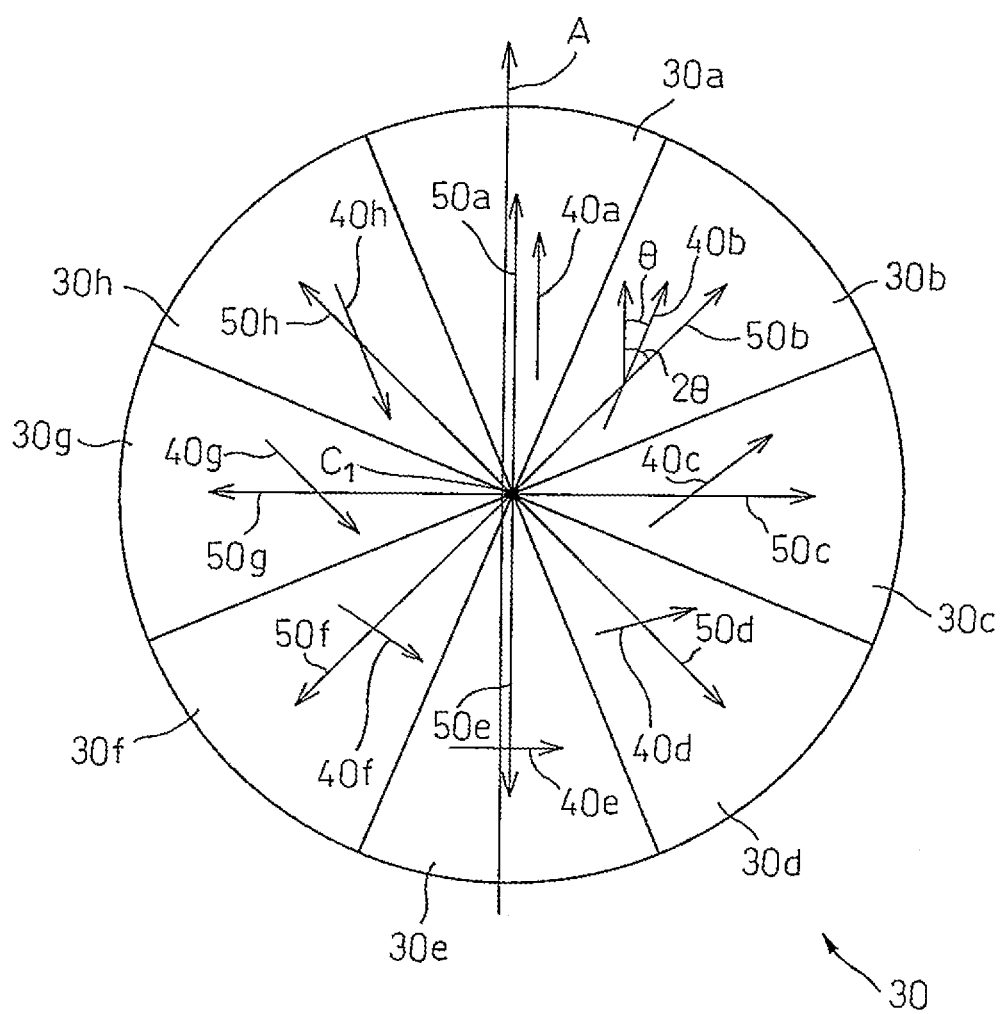
FIG. 5 is a view illustrating the alignment direction of liquid crystal in each region of the liquid crystal layer of the polarization plane rotation element, and polarization direction of linear polarization component having transmitted each region.

FIG. 5 is a schematic front view of the liquid crystal layer 30 showing alignment direction of liquid crystal in each circular sector region of the liquid crystal layer 30 and the polarization direction of the linear polarization passing each circular sector region.

In the present embodiment, the liquid crystal layer 30 has eight circular sector region 30a to 30h disposed in clockwise rotation and having different alignment directions, set so as to have equal central angle. In FIG. 5, arrows 40a to 40h respectively represent the alignment direction of the liquid crystal molecules contained in each circular sector region 30a to 30h. Arrows 50a to 50h respectively represent the polarization plane of linear polarization exiting from each circular sector region 30a to 30h. Among the arrows 50a to 50h, two arrows with the tip pointing in opposite direction means that the phases of the linear polarization represented by the arrows are shifted by π relative to each other.

A line passing through the intersection point $C_1$ and bisecting the circular sector region is referred to as the center line of the circular sector region.

Alignment direction of each circular sector region 30a to 30h is determined such that, for example, polarization plane of linear polarization component having passed the circular sector region is parallel to the center line of the circular sector region. The circular sector region 30a crossing a plane which passes the intersection point $C_1$ of the optical axis OA and the liquid crystal layer 30 and is parallel to the polarization plane A of the incident linear polarization, is denoted as the first region, and with respect to n-th circular sector region starting from the circular sector region 30a in clockwise or anticlockwise rotation, the angle θ between the alignment direction of the circular sector region and the polarization plane of the polarization component passing the circular sector region 30a is set in accordance with the following equation $$\theta = 360° \times (n-1)/(2N) \cdots (n=1, 2, \cdots, N) \quad (1)$$

where N is the total number of the circular sector regions, and in the present embodiment N=8.

For example, in the circular sector region 30a for which n=1, θ=0, i.e., in the circular sector region 30a, in order to transmit incident linear polarization without rotating the polarization plane of the linear polarization, alignment direction of liquid crystal molecules are set substantially parallel to the polarization plane A of the incident linear polarization.

If n-th circular sector region is defined as n-th region starting from the circular sector region 30a as the first region and rotating in clockwise direction, alignment direction of each circular sector region 30b to 30h is set such that the angles between the alignment direction of each circular sector regions 30b to 30h and the polarization plane A of the polarization component passing the circular sector region 30a are respectively 22.5°, 45°, 67.5°, 90°, 112.5°, 135°, 157.5°, with clockwise rotation taken as positive.

Alternatively, if n-th circular sector region is defined as n-th region starting from the circular sector region 30a as the first region and rotating in anticlockwise direction, alignment direction of each circular sector region 30b to 30h is set such that the angles between the alignment direction of each circular sector regions 30b to 30h and the polarization plane A of the polarization component passing the circular sector region 30a are respectively −157.5°, −135°, −112.5°, −90°, −67.5°, −45°, −22.5°, with clockwise rotation taken as positive.

The transparent electrodes 33, 34 are disposed so as to be opposed to each other with the entire liquid crystal layer 30 sandwiched therebetween. A prescribed electric voltage is applied by the driving circuit 5 between the transparent electrodes 33 and 34 such that the circular sector regions 30a to 30h of the liquid crystal layer 30 function as half wave plate for the wavelength included in the prescribed wavelength range.

When electric voltage is applied between the transparent electrodes 33 and 34, liquid crystal molecules are tilted in accordance with the voltage in the direction so as to become parallel to the direction of applied electric voltage. Let the angle formed by the direction of long axis of liquid crystal molecules and the direction of applied voltage be $\psi$, then light passing through the liquid crystal layer 30 forms the angle $\psi$ relative to the direction of the long axis. At this time, as has been described above, if the refractive index of liquid crystal molecules for the polarization component parallel to the alignment direction of the liquid crystal molecules is $n_\psi$, then $n_o \le n_\psi, n_e$, where $n_o$ is a refractive index for a polarization component orthogonal to the direction of a long axis of liquid crystal molecules, and $n_e$ is a refractive index for a polarization component parallel to the direction of the long axis of liquid crystal molecules.

Thus, if liquid crystal molecules contained in the liquid crystal layer 30 are aligned homogeneously, and thickness of the liquid crystal layer 30 is d, there arise optical path difference $\Delta$nd ($=n_\psi d - n_o d$) between the polarization component parallel to the alignment direction of liquid crystal molecules and the polarization component orthogonal to the alignment direction of liquid crystal molecules. Therefore, by adjusting the electric voltage applied between the transparent electrodes 33 and 34, the optical path difference between the polarization component parallel to the alignment direction of liquid crystal molecules and the polarization component orthogonal to the alignment direction of liquid crystal molecules can be adjusted. Thus, by adjusting the electric voltage applied between the transparent electrodes 33 and 34 in the polarization conversion element 1, the circular sector regions 30a to 30h respectively function as half wave plate for desired wavelength.

If each of the circular sector regions 30a to 30h functions as a half wave plate, when linear polarization having polarization plane at an angle θ relative to the alignment direction of liquid crystal molecules 37 passes the circular sector region, the polarization plane is rotated so as to form an angle −θ relative to the alignment direction of the transmitting circular sector region, i.e., the polarization plane is rotated by an angle 2θ with the alignment direction as center.

In the example illustrated in FIG. 5, alignment direction of liquid crystal molecules in each of the circular sector regions 30a to 30h is set such that the angle relative to the polarization plane A of the linear polarization incident to the circular sector region 30a is ½ of the angle of the center line of the circular sector region relative to the polarization plane A of the linear polarization incident to the circular sector region 30a of the liquid crystal layer 30. Therefore, with reference to the direction pointing upward from the intersection point C1 along the polarization plane A of the incident linear polarization, and taking the clockwise rotation as positive, the angle of polarization plane of the linear polarization having passed each of the circular sector regions 30a to 30h is 0°, 45°, 90°, 135°, 180°, 225°, 270°, 315°. In this manner, the light beam exiting from the polarization plane rotation element 3 has linear polarization component radially distributed with the optical axis OA as the center.

Figure 6:
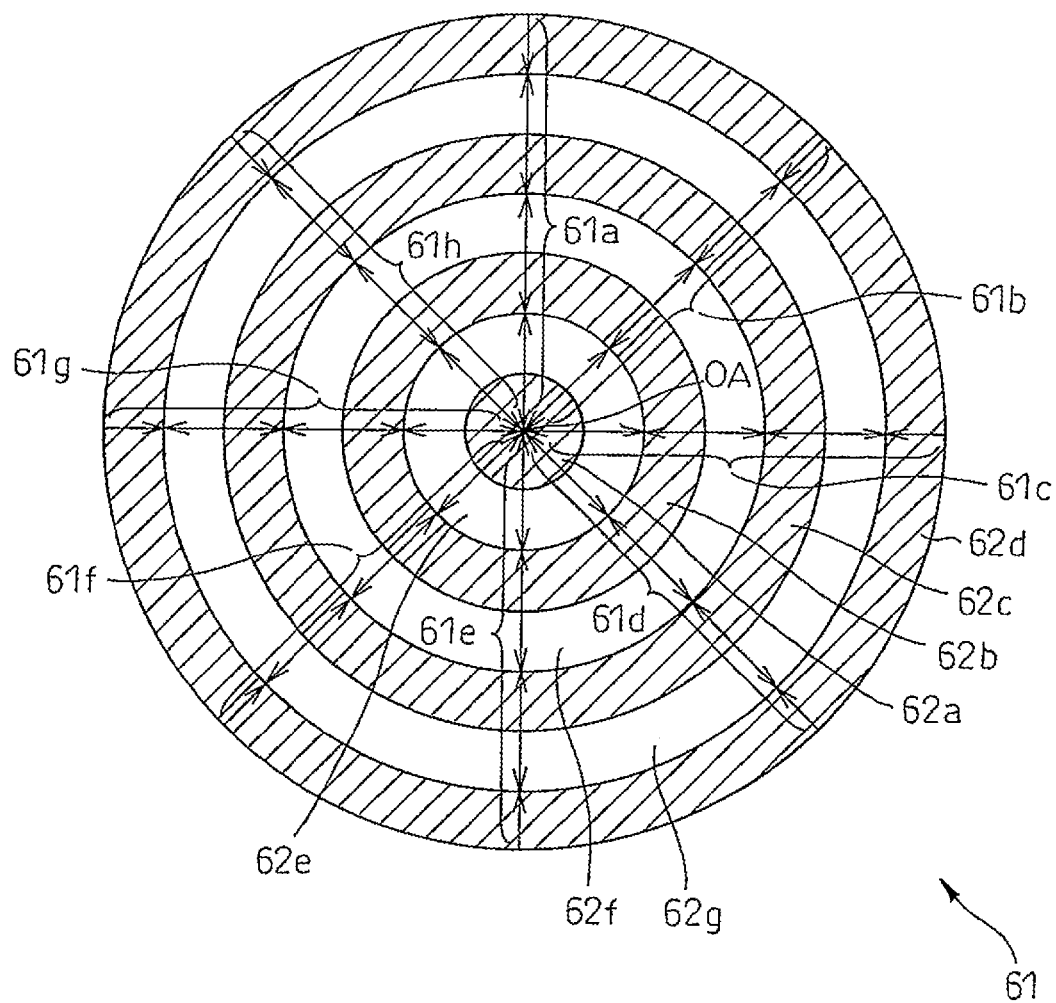
FIG. 6 is a view schematically illustrating radial polarization exiting from the polarization conversion element.

FIG. 6 is a schematic view illustrating the radial polarization 61 exiting from the polarization conversion element 1. In FIG. 6, each of arrows 61a to 61h respectively represents a linear polarization component. Among the arrows, two arrows with the tip pointing to opposite directions represent same linear polarization with the phase shifted by π relative to each other. The annular shaped regions 62a to 62d represent polarization component having passed the first annular portion of the phase reversal element 2. Also, the annular shaped regions 62e to 62g represent polarization component having passed the second annular portion of the phase reversal element 2.

As illustrated in FIG. 6, the radial polarization has 8 kinds of linear polarization 61a to 61h having polarization plane oriented in radial direction with respect to the optical axis OA. Each of the linear polarization components 61a to 61h is divided into 7 divisions along radial direction corresponding to components 62a to 62d having passed first annular portion sandwiched between the transparent electrodes 23, 24 of the phase reversal element 2, and components 62e to 62g having passed the second annular portion not sandwiched between the transparent electrodes, and their phase is shifted by π between adjoining divisions.

The polarization plane of the polarization component having passed each of the circular sector regions 30a to 30h needs only to be distributed in radial direction with the intersection point A as the center, and the polarization plane need not necessarily be parallel to the centerline of the circular sector region transmitted. Alignment direction of the circular sector regions 30a to 30h needs only to be set such that the polarization plane of the polarization having passed the circular sector regions 30a to 30h is parallel to a prescribed line passing the intersection point $c_1$ and the circular sector region. For example, alignment direction of each of the circular sector regions 30a to 30h may be set such that the angle formed by the alignment direction of each of the circular sector regions 30a to 30h and the polarization plane A of the linear polarization incident on the circular sector region 30a is the value obtained by the equation (1) above added with a prescribed offset value. In this case, the prescribed offset value is set such that the angle formed by the centerline of each of the circular sector regions 30a to 30h and the polarization plane A plus twice the offset value (i.e., the angle formed by the polarization plane pf polarization component having passed the circular sector region and the polarization plane of the linear polarization incident on the circular sector region 30a) does not exceed the angle formed by the boundary to the adjoining circular sector region and the polarization plane A, for example, to ±5°.

Number of regions of different alignment directions of the liquid crystal layer 30 of the polarization plane rotation element 3 is not limited to 8. Number of regions of different alignment directions of the liquid crystal layer 30 may be any number as long as the effect of radial polarization can be obtained. For example, the liquid crystal layer 30 may have 4, 5, 6, or 16 regions of different alignment directions.

Figure 7:
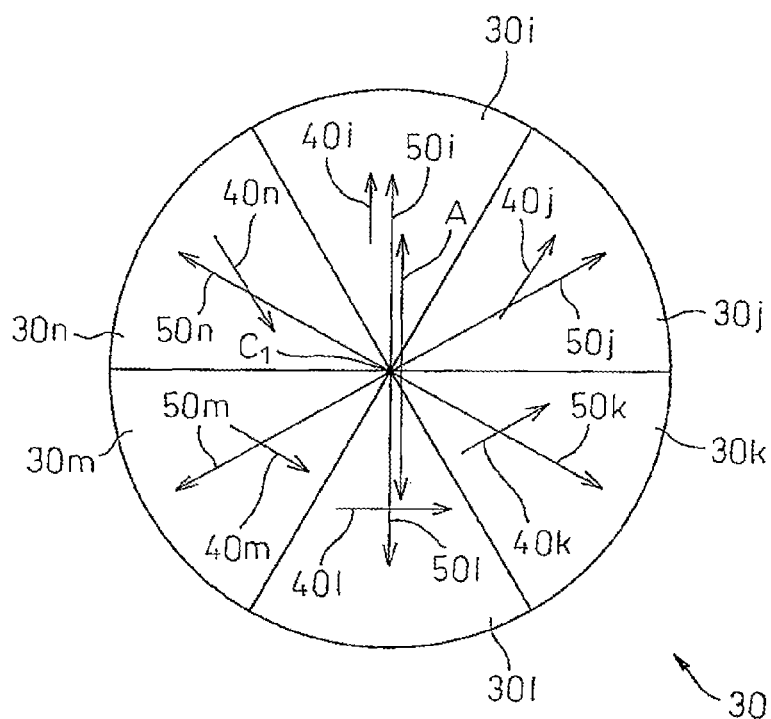
FIG. 7 is a view, for the case where the liquid crystal layer of the polarization plane rotation element has six regions of mutually different alignment directions, illustrating the alignment direction of liquid crystal in each region and polarization direction of linear polarization component having transmitted each region.

FIG. 7 is a schematic front view illustrating, in the case where the liquid crystal layer 30 includes 6 circular sector regions 30i to 30n, alignment direction of liquid crystal in each circular sector region and polarization direction of linear polarization having passed each region. In this variant of the invention, the transparent electrodes 33, 34 are disposed in opposition to each other with the liquid crystal layer 30 interposed therebetween.

In this variant, arrows 40i to 40n represent alignment direction of liquid crystal molecules contained in the circular sector regions 30i to 30n, respectively. Arrows 50i to 50n represent polarization plane of linear polarization emitting from the circular sector regions 30i to 30n, respectively. Among arrows 50i to 50n, two arrows with the tip pointing opposite direction represent two linear polarizations in the direction of the arrow with phase shifted by π relative to each other.

Among the circular sector regions 30i to 30n, in the circular sector region 30i situated above the intersection point $c_1$ of the optical axis OA and the liquid crystal layer 30, polarization plane A of the incident linear polarization coincides with the centerline of the circular sector region 30i. Therefore, this circular sector region 30i is set to be the first region. Then, in the n-th circular sector region in clockwise rotation, the alignment direction is set such that, for example, the angle formed by the alignment direction and the polarization plane A is the angle calculated in accordance with the equation (1) above. In this case, the angle formed by the alignment direction of the circular sector regions 30i to 30n and the polarization plane A of the polarization component passing the circular sector region 30i are, respectively, taking clockwise rotation as positive, 0°, 30°, 60°, 90°, 120°, 150°.

In this case, electric voltage is applied between the transparent electrodes 33, 34 sandwiching the circular sector regions 30i to 30n in accordance with wavelength of the incident light such that the liquid crystal layer 30 can function as half wave plate to the linear polarization passing the circular sector regions 30i to 30n.

Thus, with reference to the direction from the intersection point $C_1$ upward along the polarization plane of the incident linear polarization, and taking the direction of clockwise rotation as positive, the angles of the polarization plane of linear polarization passing the circular sector regions 30i to 30n are 0°, 60°, 120°, 180°, 240°, 300°. In this manner, light beam exiting from the polarization rotation element 3 has linear polarization components distributed in radial direction with the optical axis OA as the center.

The driving circuit 5 applies the driving electric voltage between the transparent electrodes 23 and 24 of the phase reversal element 2 and between the transparent electrodes 33 and 34 of the polarization plane rotation element 3. As has been described above, the angle by which long axis of a part of liquid crystal molecules 27 is tilted toward the optical axis OA in order for the phase reversal element 2 to reverse the phase of a part of incident light and the angle by which long axis of a part of liquid crystal molecules 37 is tilted toward the optical axis OA by the electric voltage applied between the transparent electrodes 33 and 34 in order to convert linear polarization to radial polarization are set to be equal. Thus, the driving circuit 5 can drive the liquid crystal layer 20 and the liquid crystal layer 30 using respective suitable driving voltage.

The driving electric voltage may be, for example, pulse height modulated (PHM) or pulse width modulated (PWM) alternating voltage. As will be described later, when a voltage regulator is connected between the driving circuit 5 and the transparent electrodes of the liquid crystal element 4, the driving circuit 5 outputs a driving voltage having suitable pulse height or suitable pulse width. On the other hand, when the driving circuit 5 receives voltage regulating signal from the voltage regulator 6, the driving circuit 5 may adjust pulse height or pulse width of the driving voltage in accordance with the voltage regulating signal.

The driving circuit 5 further may have an interface circuit connected to other apparatuses (not illustrated). In this case, the driving circuit 5 may adjust pulse height or pulse width of the driving voltage in accordance with the voltage regulating signal received via the interface circuit from other apparatus.

The voltage regulator 6 adjusts the driving voltage applied between the transparent electrodes 23 and 24 of the phase reversal element 2 and between the transparent electrodes 33 and 34 of the polarization plane rotation element 3 in accordance with the wavelength of the linear polarization incident on the polarization conversion element 1. Therefore, the voltage regulator 6 includes, for example, variable resistors connected between the driving circuit 5 and the transparent electrode 23 and the transparent electrode 33, and an operating unit for adjusting the value of resistance of the variable resistors. The operating unit may be, for example, a graduated dial. In this case, the graduated dial is graduated in accordance with the wavelength of the linear polarization incident on the polarization conversion element 1. When the gradation corresponding to a specific wavelength is set to a prescribed reference position, the value of resistance of the variable resistor is adjusted such that the polarization conversion element 1 converts linear polarization having the specific wavelength to radial polarization.

Alternatively, the voltage regulator 6 may have an operating unit and a circuit for generating voltage adjusting signal, and the circuit may be connected to the driving circuit 5. In this case, by operating the operating unit, the voltage regulator 6 outputs the voltage adjusting signal in accordance with the prescribed wavelength to the driving circuit 5.

Figure 8:
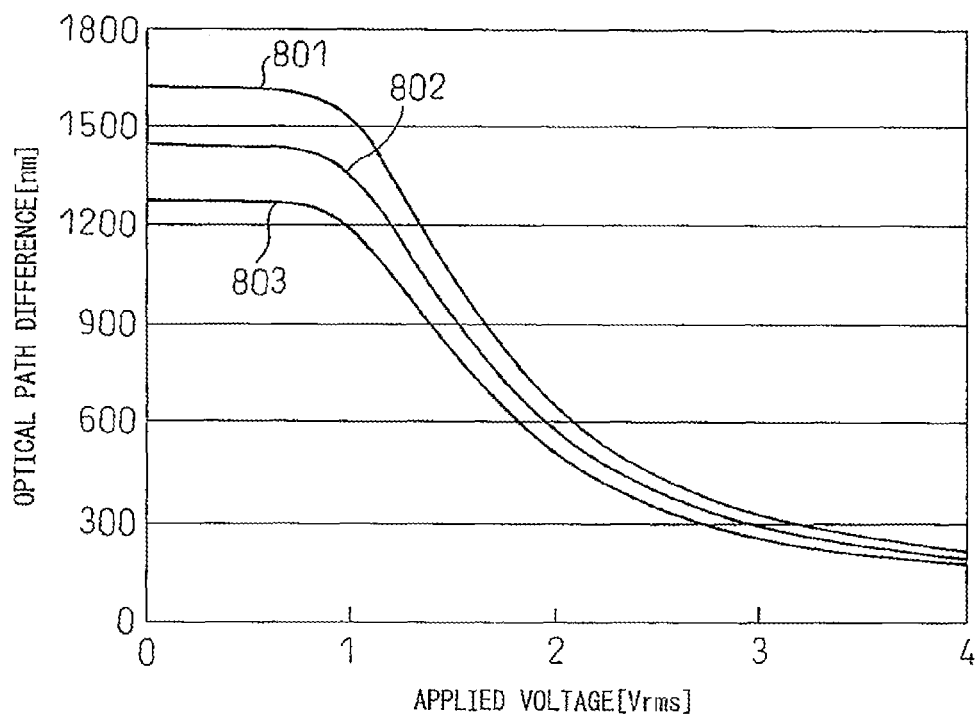
FIG. 8 is a view illustrating an example of the electric voltage applied to the liquid crystal layer between the transparent electrodes of the polarization plane rotation element and optical path difference between ordinary ray and extraordinary ray produce by the liquid crystal layer.

FIG. 8 is a view illustrating an example of the electric voltage applied to the liquid crystal layer 30 between the transparent electrodes 33 and 34, and optical path difference between ordinary ray and extraordinary ray produced by the liquid crystal layer.

In FIG. 8, horizontal axis represents voltage applied to the liquid crystal layer 30, and vertical axis represents optical path difference. Graph 801 represents the relation of applied voltage and optical path difference for light having wavelength of 405 nm. Graph 802 represents the relation of applied voltage and optical path difference for light having wavelength of 650 nm. Graph 803 represents the relation of applied voltage and optical path difference for light having wavelength of 780 nm.

For example, in order for the liquid crystal layer 30 to function as a half wave plate for light having wavelength of 405 nm, it is only necessary to apply an electric voltage that produces optical path difference of an integer multiple of 405 nm plus 202.5 nm between the transparent electrodes 33 and 34. Referring to graph 801, it is only necessary to apply an electric voltage of about 1.4 Vrms corresponding to optical path difference of 1012.5 nm between the transparent electrodes 33 and 34.

Also, for example, in order for the liquid crystal layer 30 to function as a half wave plate for light having wavelength of 650 nm, it is only necessary to apply an electric voltage that produces optical path difference of an integer multiple of 650 nm plus 325 nm between the transparent electrodes 33 and 34. Referring to graph 802, it is only necessary to apply an electric voltage of about 1.5 Vrms corresponding to optical path difference of 975 nm between the transparent electrodes 33 and 34.

Further, for example, in order for the liquid crystal layer 30 to function as a half wave plate for light having wavelength of 780 nm, it is only necessary to apply an electric voltage that produces optical path difference of an integer multiple of 780 nm plus 390 nm between the transparent electrodes 33 and 34.

Referring to graph 803, it is only necessary to apply an electric voltage of about 1.1 Vrms corresponding to optical path difference of 1170 nm between the transparent electrodes 33 and 34.

The power source 7 is connected to the driving circuit 5 and supplies DC power having a prescribed voltage to the driving circuit 5. To this end, the power source 7 may be, for example, a battery such as a lithium-ion battery, an alkaline manganese battery.

Alternatively, the power source 7 may have a converter circuit that converts power supplied by an external power source such as a commercial power source into DC power having a prescribed voltage, and supply the DC power to the driving circuit 5.

As has been described above, the polarization conversion element according to an embodiment of the present invention can convert linear polarization to radial polarization. Since the polarization conversion element utilizes liquid crystal for rotating polarization plane of incident light, it is possible, by adjusting the electric voltage applied to the liquid crystal layer in accordance with the wavelength of the incident light, to generate radial polarization over a prescribed wavelength range.

Further, since the polarization conversion element can reverse, in annular shaped portion, the phase of a part of linear polarization constituting the radial polarization relative to the phase of other portion, by collimating the radial polarization, polarization effect can be produced efficiently.

In the liquid crystal layer 20 of the phase reversal element 2, the liquid crystal molecules 27 contained in the second annular portion may be aligned in the direction parallel to the optical axis OA. In this case, the liquid crystal layer 20 and the liquid crystal layer 30 may be of same thickness, and optical characteristics and electrical characteristics of liquid crystal contained in the liquid crystal layer 20 and optical characteristics and electrical characteristics of liquid crystal contained in the liquid crystal layer 30 may be made to be same. Therefore, even when the liquid crystal molecules 27 are aligned in this manner, driving electric voltage outputted from one driving circuit 5 with same waveform and amplitude can be used to drive both liquid crystal layer 20 and the liquid crystal layer 30.

When electric voltage applied to the liquid crystal layer 20 is same as electric voltage applied to the liquid crystal layer 30, the liquid crystal molecules 27 may be aligned such that long axis direction of the liquid crystal molecules 27 in the first annular portion and short axis direction of the liquid crystal molecules 27 in the second annular portion are parallel to the polarization plane of linear polarization incident on the phase reversal element 2.

In another variant of the embodiment, in order that no optical path difference be produced between light passing the first annular shaped portion and light passing the second annular shaped portion of the phase reversal element 2, transparent electrodes may also be formed on both sides of the liquid crystal layer 20 in the second annular shaped portion.

FIG. 9A and FIG. 9B are respectively schematic front views illustrating the transparent electrode 23 provided on the light incidence side of the phase reversal element 2 according to the variant of the embodiment. As in the previous embodiment described above, the transparent electrode 24 is formed on the entire surface of the substrate so as to cover the liquid crystal layer 20 completely. The transparent electrode 24, may have the same electrode shape as the shape of the transparent electrode 23 illustrated in FIG. 9A or FIG. 9B. Alternatively, the transparent electrode 24 may have the electrode shape as illustrated in FIG. 9A or FIG. 9B, and the transparent electrode 23 may be formed so as to cover the liquid crystal layer 20 entirely.

The transparent electrode 23 has a circular electrode 23a having the intersection point $c_0$ of the optical axis OA and the phase reversal element 2, and at least one annular shaped electrode in concentric form. In this variant, the transparent electrode 23 has five annular shaped electrodes 23b to 23f around a circular electrode 23a. A gap between adjoining electrodes is preferably small. The outer circumference of the annular shaped electrode 23f corresponds to the outer circumference of the region 2a illustrated in FIG. 2.

In the example illustrated in FIG. 9A, in order to permit each annular electrode to be controlled independently, wiring is provided to each annular electrode and is connected to the driving circuit 5. In the example illustrated in FIG. 9B, starting from the circular electrode 23a, even-numbered annular shaped electrodes and odd-numbered annular electrodes are respectively electrically connected with same wirings, and the wiring connected to the even-numbered annular shaped electrodes and the wiring connected to the odd-numbered annular shaped electrodes are connected respectively to the driving circuit 5. With this construction, each of the even-numbered annular shaped electrodes can be driven at the same electric potential. Similarly, each of the odd-numbered annular shaped electrodes can also be driven at the same electric potential. In FIG. 9B, one of the even-numbered annular shaped electrode group and the odd-numbered annular shaped electrode group needs not be controlled electrically. In this case, by applying electric voltage between the other electrode group and the transparent electrode 24, the phase of light can be reversed by the liquid crystal layer sandwiched between the other electrode group and the transparent electrode 24. Since the annular shaped electrode also has thickness, the phase of light passing the annular shaped electrode is shifted relative to the phase of light not passing the annular shaped electrode. Thus, by disposing not only the annular shaped electrodes used for voltage control but also the annular shaped electrodes not used for voltage control, the phase of light passing the phase reversal element 2 can be made approximately the same all over the element when electric voltage is not applied to the liquid crystal layer 20.

Further, it is preferable that the electric potential of the even-numbered or odd-numbered annular shaped electrode group which needs not be controlled electrically is set at the same reference electric potential as the transparent electrode 24 provided on the transparent substrate on the opposite side of the annular shaped electrode group, or at the threshold electric potential that is the maximum electric potential at which the liquid crystal molecules in the liquid crystal layer 20 do not operate. The threshold electric potential is about 1 V to 2 V in effective voltage. By setting the electric potential of the annular shaped electrode group which needs not be controlled electrically in this manner, the phase reversal element 2 can control the electric potential of the liquid crystal layer 20 at constant level, it is possible to prevent the liquid crystal of the liquid crystal layer 20 from operating erroneously due to noise such as static electricity. By setting the electric potential of the annular shaped electrode group which needs not be controlled electrically at the threshold electric potential, thermal fluctuation of the liquid crystal layer 20 can be suppressed.

Further, the position of the phase reversal element 2 and the position of the polarization plane rotation element 3 may be exchanged.

Figure 10B:
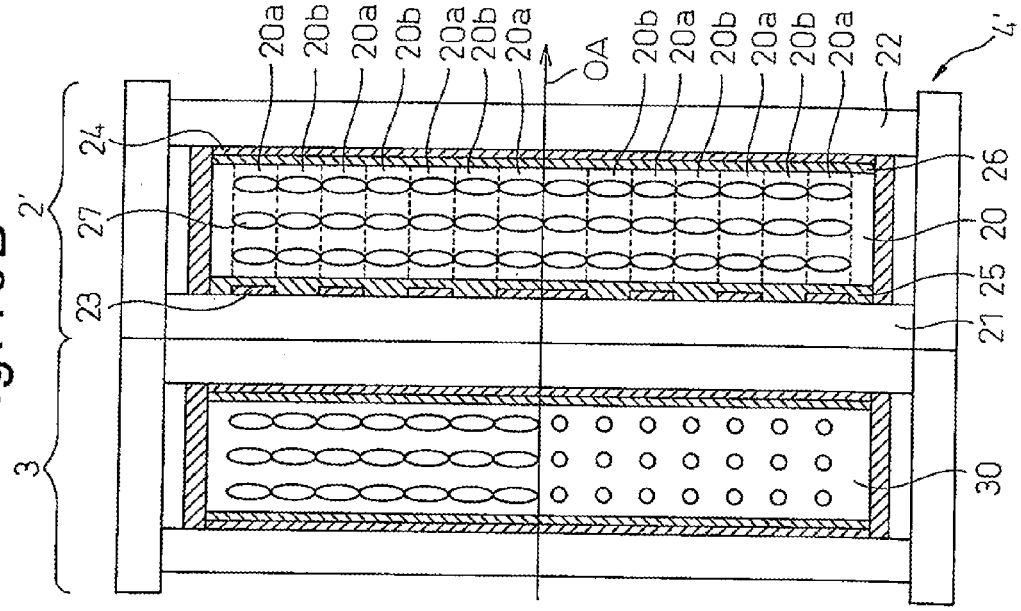
FIG. 10B is a schematic side sectional view of the polarization conversion element according to the second embodiment, taken along the line indicated by the arrow YY' of FIG. 10A.
Figure 10A:
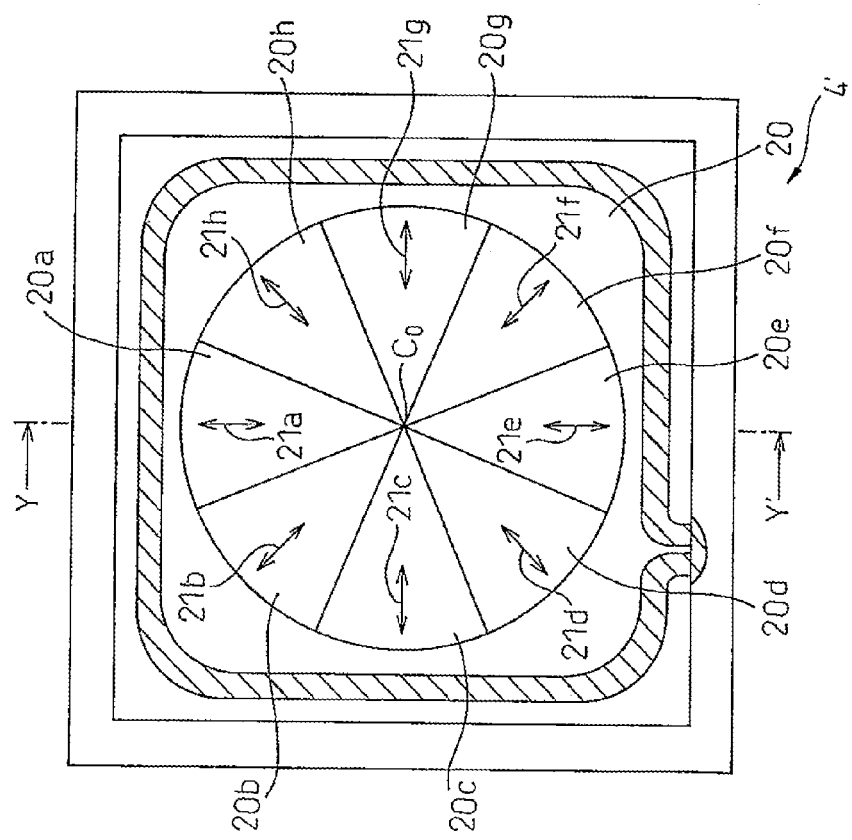
FIG. 10A is a schematic rear view of the polarization conversion element according to the second embodiment.

FIG. 10A is a schematic rear view illustrating a liquid crystal element 4' of a polarization conversion element according to the second embodiment in which the position of the phase reversal element and the position of the polarization plane rotation element are exchanged. FIG. 10B is a schematic side sectional view illustrating the liquid crystal element 4' taken along the line indicated by arrows Y, Y' illustrated in FIG. 10A. In FIG. 10A and FIG. 10B, each constituent of the polarization conversion element according to the second embodiment is denoted by the same reference numeral as the corresponding constituent of the polarization conversion element according to the first embodiment illustrated in FIGS. 2 and 3.

The polarization conversion element includes a polarization plane rotation element 3 and a phase reversal element 2' which is disposed adjacent to the polarization plane rotation element 3 along the optical axis OA, and reverses the phase of a part of linear polarization included in the radial polarization and distributed radially with the optical axis as the center.

Of these, the polarization plane rotation element 3 has the same construction as the construction of the polarization plane rotation element 3 according to the above-described embodiment. Light incident on the liquid crystal element 4' is linear polarization, and incident from the side of the polarization plane rotation element. This linear polarization is converted by the polarization plane rotation element 3 to radial polarization, and thereafter enters into the phase reversal element 2'. The phase reversal element 2' reverses the phase of a part of each linear polarization component included in the incident radial polarization.

As illustrated in FIG. 10A and FIG. 10B, the phase reversal element 2' has a liquid crystal layer 20 and transparent substrates 21, 22 disposed on both sides of the liquid crystal layer 20 along the optical axis OA. The liquid crystal molecules 27 are sealed between the transparent substrate 21, 22 and a sealing member 28. Also, the phase reversal element 2' has a transparent electrode 23 disposed between the transparent substrate 21 and the liquid crystal layer 20, and a transparent electrode 24 disposed between the liquid crystal layer 20 and the transparent substrate 22. Further, an alignment film 25 is disposed between the transparent electrode 23 and the liquid crystal layer 20. Also, an alignment film 26 is disposed between the transparent electrode 24 and the liquid crystal layer 20. These alignment films 25, 26 align the liquid crystal molecules 27 in a prescribed direction.

Further, a frame 29 is disposed on the outer circumference of each substrate, each transparent electrode and each alignment film, and this frame 29 serves to hold each substrate.

FIG. 10A illustrates the alignment direction of liquid crystal molecules sealed in the liquid crystal layer 20. The liquid crystal molecules sealed in the liquid crystal layer 20 is aligned, for example, in homogeneous alignment. The liquid crystal layer 20 has a plurality of circular sector regions 20a to 20h arranged in circumferential direction with the intersection point $C_0$ of the optical axis and the liquid crystal layer 20 as the center.

Arrows 21a to 21h show alignment directions of liquid crystal molecules contained in each circular sector region. As indicated by the arrows 21a to 21h, the liquid crystal molecules sealed in each circular sector region 20a to 20h are aligned such that its long axis points in radial direction with the intersection point $c_0$ as the center. Therefore, the polarization plane of light that exits from the polarization plane rotation element 3 is not rotated after passing each of the circular sector regions 20a to 20h.

Each of the circular sector regions 20a to 20h is preferably set so as to have a same position when projected in the direction of the optical axis OA as the circular sector regions 30a to 30h of the liquid crystal layer 30 of the polarization plane rotation element 3 as illustrated in FIG. 5. In this case, the linear polarization which has passed the circular sector region 30a and has radial polarization component with respect to the intersection point $c_1$ is transmitted by the circular sector region 20a. Similarly, linear polarizations which have passed the circular sector region 30b to 30h respectively are transmitted by the circular sector regions 20b to 20h.

The transparent electrode 23 has at least one annular shaped electrode disposed concentrically with the intersection point $c_0$ as the center. For example, the transparent electrode 23 has the same construction as the transparent electrode illustrated in FIG. 4, FIG. 9A or FIG. 9B. On the other hand, the transparent electrode 24 is disposed so as to cover the entire liquid crystal layer 20. A prescribed electric voltage is applied between the transparent electrodes 23 and 24 such that the phase of light passing through the first annular portion 20a sandwiched between transparent electrodes is shifted by π relative to the phase of light passing through the second annular portion 20b not sandwiched between transparent electrodes.

With such construction, in radial polarization having passed the phase reversal element 2', the phase of the linear polarization component included in the radial polarization having passed the first annular portion is reversed relative to the phase of light having passed the second annular portion. Therefore, this polarization conversion element also can convert the incident linear polarization to radial polarization having the distribution of polarization plane and the distribution of phase as illustrated in FIG. 6.

In this polarization conversion element according to the second embodiment, since the liquid crystal molecules of the phase reversal element 2' are aligned in radial direction with the intersection point of the optical axis and the phase reversal element 2' as the center, it is not necessary to match the polarization plane of the linear polarization incident on the polarization conversion element with the alignment direction of the liquid crystal molecules of the phase reversal element 2'. Even if the polarization plane of the incident linear polarization deviates from the centerline of the reference circular sector region (for example, the region 30a in FIG. 5) of the polarization plane rotation element 3, the polarization plane rotation element 3 can convert the incident linear polarization to radial polarization. Therefore, this polarization conversion element can simplify aligning adjustment when incorporated in an optical system.

If same voltage is applied to the liquid crystal layer 30 as the voltage applied to the liquid crystal layer 20, the liquid crystal molecules 27 may be aligned such that, in the first annular portion, long axis of the liquid crystal molecules 27 points in radial direction with the intersection point $c_0$ as the center, and in the second annular portion, long axis of the liquid crystal molecules 27 points in circumferential direction with the intersection point $c_0$ as the center.

The polarization conversion element according to the present invention can be incorporated in various light irradiation apparatus and used. For example, the polarization conversion element according to any one of above-described embodiments can be incorporated in optical pickup apparatus as an example of light irradiation apparatus.

Figure 11:
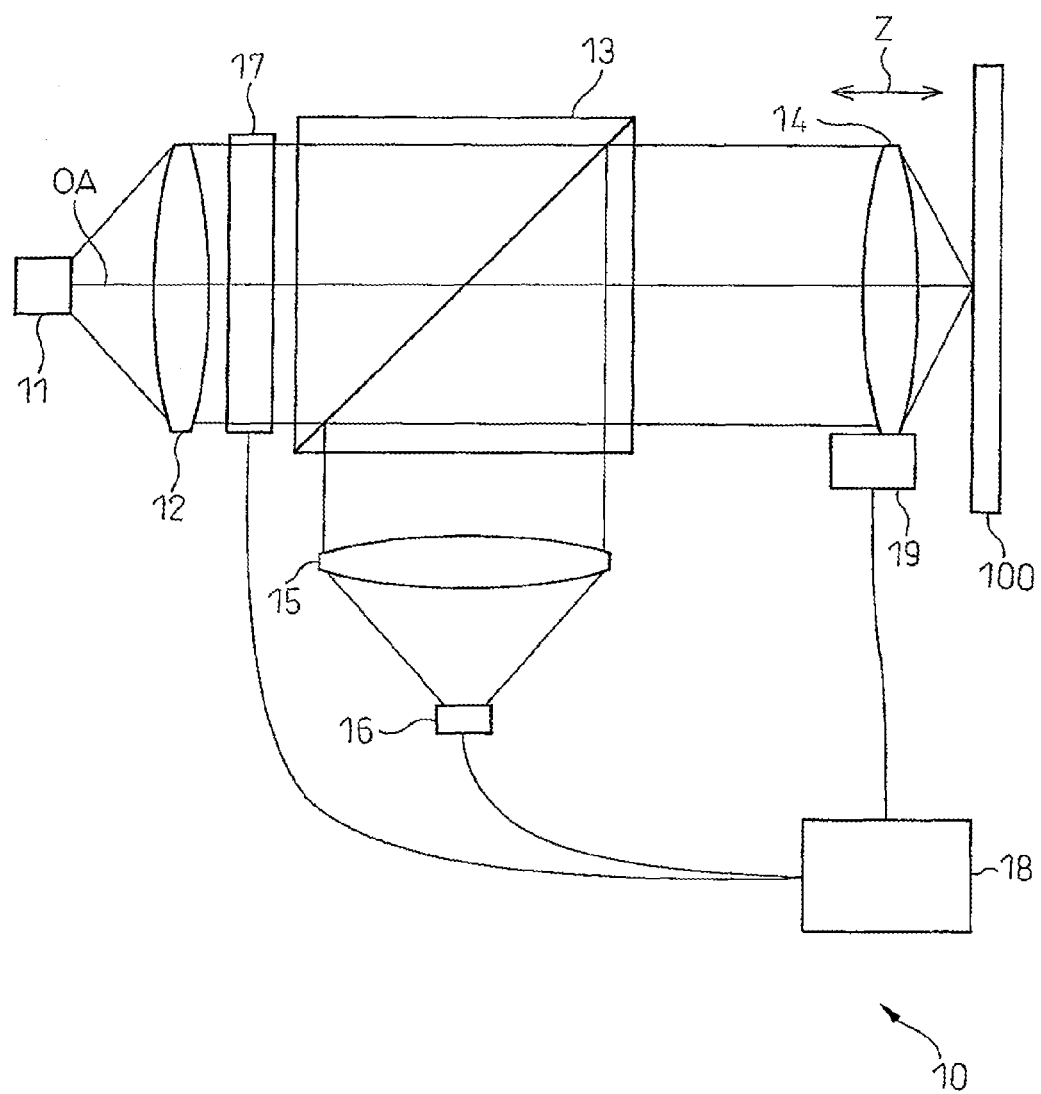
FIG. 11 is a schematic view illustrating the construction of a optical pickup apparatus as an example of a light irradiation apparatus using any one of the polarization conversion element according to various embodiments.

FIG. 11 is a schematic view illustrating the construction of a optical pickup apparatus including a polarization conversion element. As illustrated in FIG. 11, the optical pickup apparatus 10 includes a light source 11, a collimating lens 12, a beam splitter 13, an objective lens 14, an imaging lens 15, a photo detector 16, a polarization conversion element 17, a controller 18, and an actuator 19.

The light source 11, the collimating lens 12, the polarization conversion element 17, a beam splitter 13 and the objective lens 14 are arranged in a row along the optical axis. The collimating lens 12, the polarization conversion element 17, beam splitter 13 and the objective lens 14 focuses the light emitted from the light source 11 onto a recording medium 100. On the other hand, the imaging lens 15 and the photo detector 16 are disposed on the side of the beam splitter 13 in the direction orthogonal to the optical axis OA. Light reflected or scattered from the recording medium 100, after passing the objective lens 14, is reflected from the beam splitter 13, is focused by the imaging lens 15 to the photo detector 16. Although not illustrated the optical pickup apparatus 1 may include various compensating optical system such as a spherical aberration compensating optical system.

The light source includes, for example, a semiconductor laser, and outputs linear polarization.

The collimating lens 12 is disposed such that the light source 11 is positioned at the front focus so that linear polarization outputted from the light source is converted to parallel beam.

The polarization conversion element 17 is a polarization conversion element according to any one of the embodiments described above, and is preferably disposed in front side pupil plane. In the present embodiment, the polarization conversion element 17 is disposed between the collimating lens 12 and the beam splitter 13. The polarization conversion element 17 converts the linear polarization incident on the polarization conversion element 17 after passing the collimating lens 12 to radial polarization. The polarization conversion element 17 is preferably disposed such that, for example, among various regions of the liquid crystal layer of the polarization conversion element that converts linear polarization to radial polarization, the alignment direction of liquid crystal molecules contained in the region not rotating the polarization plane of the linear polarization (for example, the circular sector region 30a as illustrated in FIG. 5) is substantially coincident with the polarization plane of the linear polarization incident on the polarization conversion element 17, and the angle between the alignment direction of liquid crystal molecules in other region and the polarization plane of the incident linear polarization is ½ of the angle by which the polarization plane is rotated.

The objective lens 14 focuses the radial polarization exiting the polarization conversion element 17 onto the recording medium 100. In this case, light collimated by the objective lens 14 is z-polarization near the focus. Therefore, the spot diameter of light beam near the focus can be made smaller than the spot diameter defined by diffraction limit. For example, the spot diameter of light beam according to this embodiment is about 1/1.5 to 1/1.7 of the spot diameter defined by diffraction limit. The optical pickup apparatus 10 can have larger depth of focus of light beam.

To the objective lens 14, an actuator 19 for tracking is further provided. The actuator 19 moves the objective lens 14 in the direction of the arrow Z in the drawing so that the light beam collimated by the objective lens 14 can accurately follow the track of the recording medium 100. The actuator 19 is connected to the controller 18, and moves the objective lens 14 in accordance with the control signal from the controller 18.

Light reflected or scattered from the recording medium 100 is amplitude-modulated by the information (bit) recorded on the track surface of the recording medium 100. This light is again transmitted by the objective lens 14 to form parallel light beam. The light beam is reflected by the beam splitter 13 and enters the imaging lens 15. The imaging lens 15 focuses the incident light onto the photo detector 16.

The photo detector 16 has, for example, a plurality of semiconductor photo detector such as CCD or C-MOS arranged in an array. Each semiconductor photo detector outputs electrical signal corresponding to the intensity of detected light. The photo detector 16 averages the electrical signal outputted by each of the semiconductor photo detector, and transmits the electrical signal corresponding to the average value to the controller 18 as the light intensity signal representing the intensity of detected light.

The controller 18 reads out recording information from the light intensity signal received from the photo detector 16. The controller 18 also controls the polarization conversion element 17 and the actuator 19. To this end, the controller 18 is connected to the driving circuit of the polarization conversion element 17. Also, the controller 18 is connected to the photo detector 16, and receives the light intensity signal from the photo detector 16. The controller 18 adjusts the voltage applied to each liquid crystal layer of the polarization conversion element 17, such that the polarization conversion element 17 can convert the linear polarization outputted from the light source 11 to radial polarization. Specifically, the controller 18 changes the voltage adjusting signal outputted to the driving circuit 5 of the polarization conversion element 17 to thereby adjust the electric voltage applied to each liquid crystal layer of the polarization conversion element 17, and obtains the light intensity signal, correlates the value of electric voltage with the value of light intensity signal, and stores it in the built-in memory. Further, the controller 18 determines the value of electric voltage that maximizes the light intensity signal based on the value of light intensity signal and electric voltage stored in the memory, and transmits the voltage adjusting signal corresponding to the electric voltage to the driving circuit of the polarization conversion element 17. The driving circuit of the polarization conversion element 17 applies the driving electric voltage corresponding to the received voltage adjusting signal to each liquid crystal layer.

As has been described above, a optical pickup apparatus using the polarization conversion element focuses radial polarization onto a recording medium, and because of z-polarization effect, can obtain spot size near the focus smaller than the spot size defined by diffraction limit. Thus, this optical pickup apparatus has the resolution higher than the resolution defined by diffraction limit. Therefore, this optical pickup apparatus can read out the information recorded on a recording medium in a recording density higher than the recording density limited by the resolution defined by diffraction limit. Since this optical pickup apparatus can achieve larger depth of focus near the recording medium, occurrence of reading error due to fluctuation of distance between the recording medium and the optical pickup apparatus can be suppressed.

The pickup apparatus may have a plurality of light sources outputting light of different wavelengths. For example, the optical pickup apparatus may further have a second light source (not illustrated) separately from the light source 11, and a second beam splitter (not illustrated) for directing light outputted from each light source to the polarization conversion element 17. In this case, the second beam splitter is arranged, for example, between the collimating lens 12 and the beam splitter 13, and the second light source is arranged laterally on the side of the second beam splitter, so that, not only the light from the light source 11 is collimated onto the recording medium 100, but also the light outputted from the second light source is, after being reflected from the second beam splitter, collimated via the beam splitter 13, the polarization conversion element 17, and the objective lens 14 onto the recording medium 100.

The controller 18 causes the light source or the second light source to output light, and as has been described in FIG. 8, transmits the voltage adjusting signal corresponding to the light source outputting light to the driving circuit of the polarization conversion element 17 to thereby enable the polarization conversion element 17 to convert the light from the light source to radial polarization. Thus, the optical pickup apparatus can collimate the light outputted from any of the plurality of light sources onto the recording medium 100 in a spot size smaller than the spot size defined by diffraction limit.

The polarization conversion element 17 may be disposed between the beam splitter 13 and the objective lens 14 so as to transmit the light reflected or scattered from the recording medium 100.

The present invention is not limited to the embodiments described above. For example, the polarization conversion element according to the embodiments described above can be advantageously used in optical processing apparatus such as laser knife, laser processing machine, etc., which uses light to process an object. In this case, as in the optical pickup apparatus described above, the polarization conversion element is preferably disposed between the light source outputting linear polarization and the objective lens collimating the light, in particular, in the pupil plane of the objective lens on the side of the light source. With such construction, collimated light near the focus of the objective lens becomes z-polarization. Therefore, an optical processing apparatus using the polarization conversion element can achieve minimum machinable size smaller than diffraction limit.

In the same manner, the polarization conversion element according to the embodiment described above can be used advantageously in various light irradiation apparatuses such as a laser microscope, or an interferometer, which uses light to observe an object or measure the shape of an object. In this case, the polarization conversion element is preferably disposed between a light source outputting linear polarization and an objective lens collimating the light, especially in the pupil plane of the objective lens on the light source side. When the polarization conversion element is used in a confocal laser microscope, a sample to be irradiated with radial polarization is placed, for example, on a X-Y stage, and by moving the X-Y stage, the radial polarization is focused on different points on the sample. Alternatively, the confocal laser microscope may use a galvano-mirror, etc., to deflect the laser beam emitted from the light source, so that light is transmitted by the polarization conversion element to generate radial polarization, which can be used to scan a sample.

When the polarization conversion element is used in a laser microscope, it is possible to adjust the driving voltage applied to each liquid crystal layer of the polarization conversion element, to thereby select and switch between whether resolution in depth direction of a sample, i.e., in the direction of the optical axis OA is to be improved or resolution in the direction parallel to the sample surface, i.e., in the direction orthogonal to the optical axis OA is to be improved higher than the resolution defined by diffraction limit.

When resolution in depth direction of a sample is to be improved, driving voltage applied to each liquid crystal layer of the polarization conversion element is set to a voltage at which the polarization conversion element does not convert the incident linear polarization to radial polarization. For example, the driving voltage applied to liquid crystal layers is adjusted such that, in each region of the liquid crystal layer of the polarization conversion element, difference between the optical path for ordinary ray and the optical path for extraordinary ray is an integer multiple of the wavelength of light outputted from the light source of the laser microscope. Also, driving voltage applied to the liquid crystal layer of the phase reversal element is adjusted such that difference between the optical path for light passing the first annular portion of the liquid crystal layer and the optical path for light passing the second annular portion is an integer multiple of the wavelength of light outputted from the light source. In this case, the resolution in the direction parallel to the sample surface, i.e., in the direction orthogonal to the optical axis OA, is the resolution defined by diffraction limit.

On the other hand, in order to obtain the resolution in the direction parallel to the sample surface that is higher than the resolution defined by diffraction limit, driving voltage applied to each liquid crystal layer of the polarization conversion element is adjusted such that the polarization conversion element can convert, as described above, the incident linear polarization to radial polarization. In this case, however, as compared to the case where linear polarization is collimated to the sample object plane, the range of small spot size of collimated light on the sample object plane becomes longer in depth direction. Therefore, when radial polarization is focused on the object plane of the sample, resolution in depth direction is lower than the resolution in depth direction when linear polarization is focused on the object plane of the sample.

In this way, a laser microscope using the polarization conversion element according to the embodiment described above can either improve resolution in the direction parallel to the sample surface by focusing radial polarization onto the sample or improve resolution in depth direction by focusing non-radial polarization onto the sample by suitably adjusting the driving voltage applied to each liquid crystal layer of the polarization conversion element.

Further, in order to switch the light to be focused onto a sample, this laser microscope needs only to change the driving voltage applied to each liquid crystal layer. Thus, unlike the case where, for example, a polarization conversion element using an element such as photonic crystal that does not permit amount of rotation of polarization plane to be adjusted, this laser microscope needs not be mechanically moved partly or entirely in order to switch whether or not radial polarization is used to irradiate a sample. Therefore, with this laser microscope, shift of the focusing position at the time of switching the light can be prevented.

As has been described above, the polarization conversion element may be used to convert incident linear polarization to radial polarization, or the linear polarization may be outputted as it is, and the laser microscope may be used by switching between the two cases. In such case, even if the electric voltage applied to the liquid crystal layer of the polarization plane rotation element of the polarization conversion element is adjusted within substantially usable range, not all the liquid crystal molecules are aligned in a definite direction, for example, in the direction parallel to the optical axis, so that birefringence of the liquid crystal layer of the polarization plane rotation element may not vanish completely. If there is birefringence, i.e., if there is a difference between refractive index for ordinary ray and refractive index for extraordinary ray is not zero, among a plurality of regions dividing the liquid crystal layer of the polarization plane rotation element in circumferential direction, direction of polarization of linear polarization passing the region in which alignment direction of liquid crystal is not parallel to the polarization plane of incident linear polarization is rotated. As a result, light exiting from the polarization plane rotation element is no longer linear polarization.

In one variant of the invention, a residual birefringence compensation element having the birefringence that cancels the optical path difference between ordinary ray and extraordinary ray having passed the liquid crystal layer (hereinafter referred to as residual birefringence, for convenience) when a prescribed voltage within the adjustable voltage range is applied to the liquid crystal layer of the polarization plane rotation element, is disposed on the incidence side or on the exit side of the polarization plane rotation element. The prescribed voltage includes the voltage value zero, i.e., the case where no voltage is applied to the liquid crystal layer of the polarization plane rotation element. The prescribed voltage may be an electric voltage that is different from the voltage applied to the liquid crystal layer of the polarization plane rotation element, for example, may be a voltage within the adjustable voltage range that gives minimum residual birefringence.

FIG. 12A is a schematic front view illustrating the residual birefringence compensation element of the polarization conversion element according to a variant of the present invention as seen from the incidence side, and FIG. 12B is a schematic side sectional view of the polarization conversion element taken along the line indicated by the arrows yy' of FIG. 12A. In FIGS. 12A and 12B, each constituent of the polarization plane rotation element is denoted by the same reference numerals the corresponding constituent of the polarization plane rotation element illustrated in FIG. 2 and FIG. 3A. In FIG. 12B, the phase reversal element is not illustrated.

In this variant, on the exit side of the polarization plane rotation element 3 illustrated in FIG. 3A, there is disposed a residual birefringence compensation element 300 having the same construction as the polarization plane rotation element 3. Thickness of the liquid crystal layer 310 in the direction of the optical axis, and physical properties of the liquid crystal molecules contained in the liquid crystal layer 310 of the residual birefringence compensation element 300 are respectively the same as thickness of the liquid crystal layer 30, and physical properties of the liquid crystal molecules contained in the liquid crystal layer 30 of the polarization plane rotation element 3. The liquid crystal layer 310 of the residual birefringence compensation element 310 has 8 circular sector regions 310a to 310h arranged in the circumferential direction with the intersection point $c_2$ as the center. Each circular sector region 310a to 310h is disposed so as to have the position and shape projected in the direction of the optical axis substantially coincident with the position and shape of the circular sector regions 30a to 30h of the liquid crystal layer 30 illustrated in FIG. 5. Therefore, light flux parallel to the optical axis OA and passing the circular sector region 30a passes the circular sector region 310a.

Arrows 311a to 311h in dotted line illustrated in FIG. 12A respectively represent alignment direction of liquid crystal molecules in the circular sector regions 310a to 310h. Arrows 40a to 40h in solid line represent alignment direction of liquid crystal molecules in the circular sector regions 30a to 30h of the liquid crystal layer 30. As is evident from FIG. 12A, liquid crystal molecules in each of the circular sector regions 310a to 310h of the residual birefringence compensation element 300 are aligned in directions orthogonal to the alignment directions of liquid crystal molecules in the corresponding circular sector regions, i.e., in the circular sector region having coincident positions along the optical axis OA. Therefore, fast axis in each circular sector region of the liquid crystal layer 30 and fast axis in the corresponding circular sector region of the liquid crystal layer 310 are orthogonal to each other in a plane perpendicular to the optical axis OA. Thus, when no voltage is applied or same voltage is applied both to the liquid crystal layer 30 and to the liquid crystal layer 310, birefringence of the liquid crystal layer 30 and the liquid crystal layer 310 are equal and cancel each other, so that polarization plane of linear polarization passing the polarization conversion element is not rotated.

On the other hand, by adjusting the electric voltage applied to the liquid crystal layer 30 of the polarization plane rotation element 3 such that difference of optical path for ordinary ray and for extraordinary ray in each circular sector region of the liquid crystal layer 30 is larger by ½ of the wavelength of incident linear polarization as compared to when no electric voltage is applied to the liquid crystal layer 30, the polarization conversion element can convert incident linear polarization to radial polarization.

The residual birefringence compensation element 310 may have, in place of the liquid crystal layer, other birefringence element exhibiting birefringence, for example, birefringence crystal such as quartz, photonic crystal, or phase difference film formed by stretching polymer film. In this case, the birefringence element is disposed such that, in each circular sector region of the residual birefringence compensation element 310, the fast axis of the birefringence element and the fast axis in the corresponding circular sector region of the liquid crystal layer 30 of the polarization plane rotation element 3 are orthogonal to each other. Thickness of the birefringence element in the direction of the optical axis is set such that difference of optical path for ordinary ray and extraordinary ray passing the birefringence element of the residual birefringence compensation element 310 is equal to the residual birefringence of the liquid crystal layer 30 when a prescribed voltage is applied.

Liquid crystal molecules contained in the liquid crystal layer 30 of the polarization plane rotation element 3 may be aligned vertically. With this alignment, the voltage applied to the liquid crystal layer 30 when residual birefringence is minimum is decreased so that power consumption of the polarization conversion element in the case where the polarization conversion element transmits linear polarization as it is can be suppressed.

Further, the objective lens used in combination with the polarization conversion element such as the objective lens incorporated in a microscope apparatus may be exchangeable. In this case, the objective lens may have different pupil diameter. In order to obtain same super-high resolution effect even if an objective lens with different pupil diameter is used, the phase reversal element of the polarization conversion element preferably forms prescribed number of concentric annular shaped portions in the light flux passing the phase reversal element and reverses the phase of adjoining annular shaped portions irrespective of the pupil diameter of the objective lens. The prescribed number is an integer not less than 2, for example, an integer of not less than 3 and not more than 8.

The polarization plane rotation element according to the embodiment described above can be applied owing to its structure to various objective lenses of different pupil diameter.

Figure 13A:
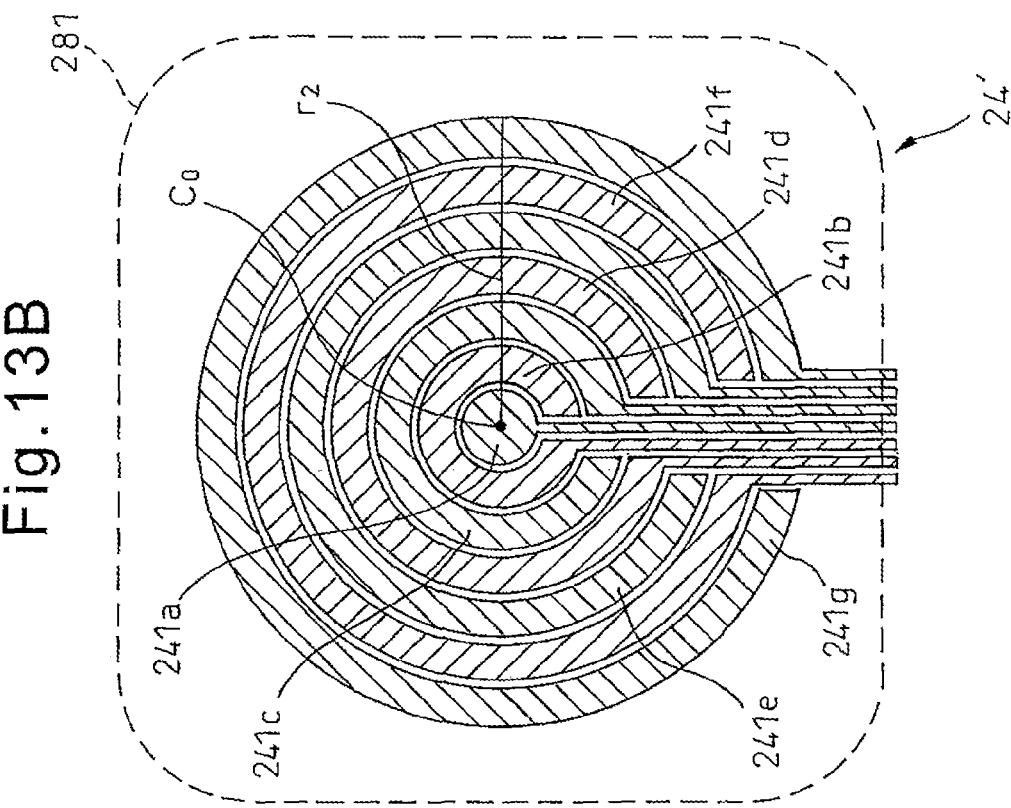
FIG. 13A is a schematic front view illustrating the structure of one of the transparent electrodes of the phase reversal element according to a variant of the present invention.
Figure 13B:
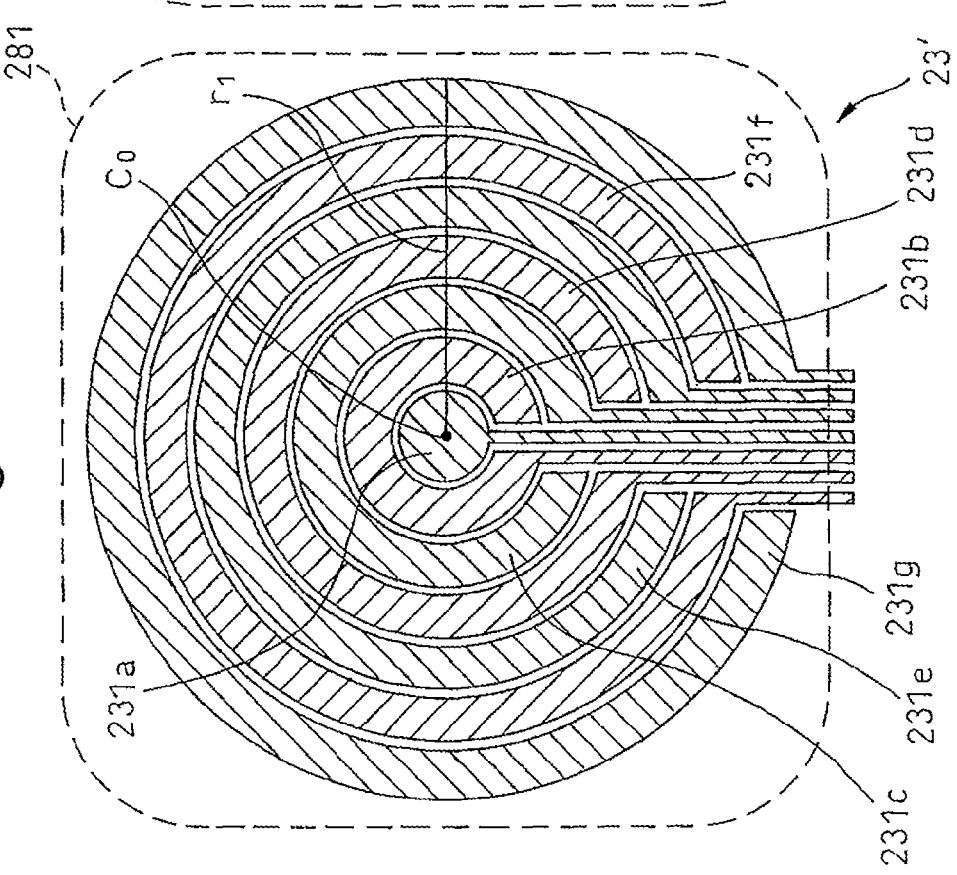
FIG. 13B is a schematic rear view illustrating the structure of the other of the transparent electrodes of the phase reversal element according to the variant of the present invention.

FIG. 13A is a schematic front view illustrating the structure of the transparent electrode 23' on the light incidence side of the phase reversal element according to a variant that resolves this problem. FIG. 13B is a schematic front view illustrating the structure of the transparent electrode 24' on the light exit side of the phase reversal element according to the variant. In FIG. 13A and FIG. 13B, in order to help understand difference of size of the transparent electrode 23' and size of the transparent electrode 24', an inner boundary 281 of a sealing member in the liquid crystal layer of the phase reversal element is illustrated. The structure of the phase reversal element other than the transparent electrodes may be same as the structure of the phase reversal element according to any one of the embodiments described above. Therefore, only the transparent electrode will be explained below.

In this variant, the transparent electrode 23' has 7 concentric annular shaped electrodes 231a to 231g with the intersection point $c_0$ of the optical axis and the phase reversal element as the center. By these annular electrodes, approximately the entire circular region of radius $r_1$ (i.e., distance from the intersection point $c_0$ to the outer periphery of the outermost annular electrode 231g of the transparent electrode 23') with $c_0$ as the center is covered. The radius $r_1$ is set, for example, such that it is nearly equal to the radius of light flux passing the phase reversal element when an objective lens of relatively large pupil diameter is used.

Similarly, the transparent electrode 24' has 7 concentric annular shaped electrodes 241a to 241g with the intersection point $c_0$ as the center. By these annular electrodes, approximately entire circular region of radius $r_2$ (i.e., distance from the intersection point $c_0$ to the outer periphery of the outermost annular electrode 241g of the transparent electrode 24') with $c_0$ as the center is covered. The radius $r_2$ is set, for example, such that it is nearly equal to the radius of light flux passing the phase reversal element when an objective lens of relatively small pupil diameter is used. Thus, the radius $r_2$ is set to a value smaller than the radius $r_1$.

In either of the transparent electrode 23' or the transparent electrode 24', two adjoining annular electrodes are disposed with separation narrower than the width of the annular electrode from each other, and are insulated from each other.

When an objective lens with relatively large pupil diameter is used, all the annular electrodes of the transparent electrode 24' are energized at equal potential, whereas annular electrodes of the transparent electrode 23' are alternately energized. For example, annular electrodes 231a, 231c, 231e and 231g are energized while annular electrodes 231b, 231d and 231f are not energized. By appropriately adjusting the voltage between the energized annular electrodes of the transparent electrode 23' and the transparent electrode 24', the phase of light passing the liquid crystal layer sandwiched between these electrodes is shifted by $\pi$ relative to the phase of light passing the liquid crystal layer sandwiched between non-energized annular electrodes of the transparent electrode 23' and the transparent electrode 24'.

When an objective lens with relatively small pupil diameter is used, all the annular electrodes of the transparent electrode 23' are energized at equal potential, whereas annular electrodes of the transparent electrode 24' are alternately energized. For example, annular electrodes 241a, 241c, 241e and 241g are energized while annular electrodes 241b, 241d and 241f are not energized. By appropriately adjusting the voltage between the energized annular electrodes of the transparent electrode 24' and the transparent electrode 23', the phase of light passing the liquid crystal layer sandwiched between these electrodes is shifted by $\pi$ relative to the phase of light passing the liquid crystal layer sandwiched between non-energized annular electrodes of the transparent electrode 24' and the transparent electrode 23'.

The number of annular electrodes of the transparent electrode 23' and number of annular electrodes of the transparent electrode 24' are equal, and the two transparent electrodes are different in radius. Therefore, the phase reversal element according to this variant can generate, when either of two objective lenses with different pupil diameter is used, equal number of concentric annular shaped portions with the optical axis as the center in the light flux in which phase is reversed in adjoining portions.

Number of annular electrode of two transparent electrodes may be different. For example, in order that radius of the transparent electrode 23' is equal to radius of the transparent electrode 24', the transparent electrode 24' may have one or more annular electrode outside of the annular electrode 241g.

According to still another variant of the phase reversal element, the transparent electrode provided on one side of the liquid crystal layer of the phase reversal element is disposed so as to cover entire liquid crystal layer in the same manner as the transparent electrode 24 illustrated in FIG. 3A, and the transparent electrode provided on the other side of the liquid crystal layer may have a plurality of concentric annular electrodes provided so as to cover approximately the entire liquid crystal layer in the same manner as the transparent electrode 23' illustrated in FIG. 13A. In this variant, however, width of each annular electrode is narrower than width of the annular electrode of the transparent electrode 23', and is preferably set to about $\frac{1}{10}$ to about $\frac{1}{2}$ of the width of the annular electrode of transparent electrode 23'. In this case, grouping adjoining plurality of annular electrodes as one set, along the radial direction with the intersection point with the optical axis as the center, alternately energized set of annular electrodes and non-energized set of annular electrodes are disposed. With this construction, annular shaped portions are formed such that phase is reversed between adjoining portions. By suitably selecting an energized set of annular electrodes in accordance with pupil diameter of an objective lens, a prescribed number of annular shaped portions are formed irrespective of the pupil diameter.

As will be apparent from the above description, those skilled in the art can make various modification to each of the embodiments without departing from the scope of the present invention.

LIST OF REFERENCE NUMERALS 1 polarization conversion element
2, 2' phase reversal element
3 polarization plane rotation element
4, 4' liquid crystal element
20, 30 liquid crystal layer
20a to 20h, 30a to 30n circular sector region
21, 22, 31, 32 transparent substrate
23, 24, 33, 34 transparent electrode
25, 26, 35, 36 alignment film
27, 37 liquid crystal molecule
28, 38 sealing member
29, 39 frame
10 optical pickup apparatus
11 light source
12 collimating lens
13 beam splitter
14 objective lens
15 imaging lens
16 photo detector
17 polarization conversion element
18 controller
19 actuator
300 residual birefringence compensation element
310 liquid crystal layer
310a to 310h circular sector region

The invention claimed is:

1. A polarization conversion element comprising:
   a phase reversal element that reverses phase of a part of incident light having a prescribed wavelength; and
   a polarization plane rotation element that converts linear polarization having the prescribed wavelength to radial polarization, disposed along an optical axis;
   wherein the polarization plane rotation element comprises a liquid crystal layer containing liquid crystal molecules, and two first transparent electrodes disposed in opposition to each other so as to sandwich the liquid crystal layer;
   wherein the liquid crystal layer has a plurality of regions arranged along circumferential direction with a first intersection point of the polarization plane rotation element and the optical axis as a center, alignment direction of the liquid crystal molecules contained in each of the plurality of regions being different from each other;
   wherein, when an electric voltage in accordance with the prescribed wavelength is applied between the two first transparent electrodes, each of the plurality of regions of the liquid crystal layer rotates polarization plane of a component of the linear polarization passing the region in accordance with the alignment direction of the liquid crystal molecules contained in the region such that the polarization plane becomes parallel to radial direction with the first intersection point as the center; and
   wherein the phase reversal element has first annular portions and second annular portions alternately disposed along radial direction with a second intersection point of the phase reversal element and the optical axis as a center, and reverses the phase of the linear polarization or the radial polarization incident on the first annular portions relative to the phase of the linear polarization or the radial polarization incident on the second annular portions.

2. The polarization conversion element according to claim 1,
   wherein the alignment direction of the liquid crystal molecules contained in each of the plurality of regions is such that the angle between the alignment direction and the polarization plane of the linear polarization incident on the polarization plane rotation element is ½ of the angle made by a prescribed line passing the first intersection point and the relevant region with the polarization plane; and
   wherein, by an electric voltage in accordance with the prescribed wavelength being applied between the two first transparent electrodes, the polarization plane rotation element rotates the polarization plane of a component of the linear polarization passing each of the plurality of regions by twice the angle between the polarization plane of the linear polarization and the alignment direction so as to bring the polarization plane of the component parallel to the prescribed line.

3. The polarization conversion element according to claim 2, wherein the prescribed line in each of the plurality of regions is a line passing the first intersection point and bisecting the relevant region.

4. The polarization conversion element according to claim 1, wherein, when, among the plurality of regions, one of two regions intersecting a plane which passes the optical axis and is parallel to the polarization plane of the linear polarization, is taken as the first region, and total number of the plurality of regions is taken as N, the alignment direction in each of the plurality of regions is set such that the angle θ formed by the alignment direction in n-th region in clockwise or anticlockwise rotation starting from the first region with the polarization plane of the linear polarization incident on the first region is determined by the equation $$\theta = 360° \times (n-1)/(2N)$$

where n is an integer from 1 to N.

5. The polarization conversion element according to claim 1, wherein the phase reversal element comprises:
   a second liquid crystal layer containing second liquid crystal molecules; and
   two second transparent electrodes disposed in opposition to each other so as to sandwich the second liquid crystal layer; and
   wherein one of the two second transparent electrodes is a plurality of annular electrodes corresponding to the first annular portion, and by applying an electric voltage in accordance with the prescribed wavelength between the annular electrodes and the other of the two second transparent electrodes, phase of the linear polarization or the radial polarization incident on the first annular portion is reversed.

6. The polarization conversion element according to claim 5,
   wherein the phase reversal element is disposed on the light incidence side of the polarization plane rotation element; and
   wherein the second liquid crystal molecules contained in the second liquid crystal layer are aligned along the direction parallel to the polarization plane of the linear polarization incident on the phase reversal element.

7. The polarization conversion element according to claim 5,
   wherein the phase reversal element is disposed on the light exit side of the polarization plane rotation element; and
   wherein the second liquid crystal molecules contained in the second liquid crystal layer are aligned in radial direction with the second intersection point as the center.

8. The polarization conversion element according to claim 5, further comprising:
   a driving circuit that changes the electric voltage in accordance with the prescribed wavelength, and applies the electric voltage between the two first transparent electrodes and between the two second transparent electrodes.

9. The polarization conversion element according to claim 1, further comprising:
   a residual birefringence compensation element disposed on light incidence side or light exit side of the polarization plane rotation element;
   wherein the residual birefringence compensation element has a plurality of second regions with positions projected in the direction of the optical axis that coincide respectively with the plurality of regions of the liquid crystal layer of the polarization plane rotation element, each of the plurality of second regions has birefringence that cancels birefringence produced in the region among the plurality of regions of the liquid crystal layer that coincides in position projected in the direction of the optical axis when a second electric voltage is applied to the liquid crystal layer.

10. The polarization conversion element according to claim 9, wherein the residual birefringence compensation element comprises a third liquid crystal layer having the plurality of second regions, and each of the plurality of second regions in the third liquid crystal layer has third liquid crystal molecules aligned orthogonally to the alignment direction of the liquid molecules in the region among the plurality of regions in the liquid crystal layer of the polarization plane rotation element that coincides in position projected in the direction of the optical axis.

* * * * *